(12) United States Patent
Yoruk et al.

(10) Patent No.: US 12,165,412 B2
(45) Date of Patent: Dec. 10, 2024

(54) ELECTRONIC DETECTION OF PRODUCTS, POSES OF PRODUCTS, AND ARRANGEMENT OF PRODUCTS IN A DISPLAY STRUCTURE, ELECTRONIC SCORING OF THE DETECTED PRODUCT POSES AND PRODUCT ARRANGEMENT, AND ELECTRONIC GENERATION OF A REFERENCE IMAGE OF A PRODUCT IN ITS CANONICAL POSE

(71) Applicant: VISPERA BILGI TEKNOLOJILERI SANAYI IC VE DIS TICARET A.S., Besiktas (TR)

(72) Inventors: Erdem Yoruk, Besiktas (TR); Kaan Taha Oner, Besiktas (TR); Ceyhun Burak Akgul, Besiktas (TR)

(73) Assignee: VISPERA BILGI TEKNOLOJILERI SANAYI IC VE DIS TICARET A.S., Istanbul (TR)

( * ) Notice: Subject to any disclaimer, the term of this patent is extended or adjusted under 35 U.S.C. 154(b) by 49 days.

(21) Appl. No.: 16/768,837

(22) PCT Filed: Dec. 1, 2017

(86) PCT No.: PCT/TR2017/050620
§ 371 (c)(1),
(2) Date: Jun. 1, 2020

(87) PCT Pub. No.: WO2019/108146
PCT Pub. Date: Jun. 6, 2019

(65) Prior Publication Data
US 2021/0073574 A1    Mar. 11, 2021

(51) Int. Cl.
*G06V 20/52* (2022.01)
*G06T 7/73* (2017.01)
*G06V 20/68* (2022.01)

(52) U.S. Cl.
CPC ............... *G06V 20/52* (2022.01); *G06T 7/74* (2017.01); *G06T 2207/30128* (2013.01); *G06V 20/68* (2022.01); *G06V 2201/12* (2022.01)

(58) Field of Classification Search
CPC ............ G06K 9/6214; G06K 2209/17; G06K 2209/40; G06K 9/00771; G06T 7/74; G06T 2207/30128
(Continued)

(56) References Cited

U.S. PATENT DOCUMENTS 6,594,623 B1    7/2003  Wang et al.
6,662,338 B1   12/2003  Rezzi et al.
(Continued)

FOREIGN PATENT DOCUMENTS

EP    2375365 A1   10/2011
EP    3185181 A1    6/2017
(Continued)

OTHER PUBLICATIONS

Dalal et al., "Histograms of Oriented Gradients for Human Detection", International Conference on Computer Vision & Pattern Recognition, Jun. 2005, pp. 1-8.
(Continued)

*Primary Examiner* — Kathleen Y Dulaney
(74) *Attorney, Agent, or Firm* — FisherBroyles LLP; Bryan A. Santarelli

(57) ABSTRACT

An embodiment of an electronic processing system includes an image-processing circuit, a pose circuit, and a score circuit. The image-processing circuit is configured to receive a captured image of at least one product disposed in a display structure, and to identify each of the at least one product in the captured image. The pose circuit is configured to determine a respective pose of each of the at least one product, and to compare the respective pose of each of the
(Continued)

at least one product to a respective canonical pose of each of the at least one product. And the score circuit is configured to generate a pose score in response to a respective comparison for each of the at least one product. For example, such an electronic processing system can be configured to detect a respective improper pose of one or more products, and to generate a pose score that is related to the number of improper poses detected, and the average "distance" between each improper pose and the respective canonical pose (e.g., label facing straight out from the display structure). And the electronic processing system can be configured to perform the described functions in real time.

24 Claims, 19 Drawing Sheets

(58) Field of Classification Search
USPC .......... 382/110, 10, 103; 700/236; 340/5.92; 705/28, 22
See application file for complete search history.

(56) References Cited

U.S. PATENT DOCUMENTS

| | | | | |
|---|---|---|---|---|
| 8,630,924 | B2* | 1/2014 | Groenevelt | G06Q 10/087 283/79 |
| 10,007,964 | B1* | 6/2018 | Calhoon | G06T 3/40 |
| 10,040,628 | B1* | 8/2018 | Misra | G06Q 10/08 |
| 10,127,438 | B1* | 11/2018 | Fisher | G06V 10/82 |
| 10,157,452 | B1* | 12/2018 | Tighe | G06T 5/80 |
| 10,318,837 | B2* | 6/2019 | Shekar | G06F 18/22 |
| 2009/0063307 | A1* | 3/2009 | Groenovelt | G06Q 10/087 705/28 |
| 2013/0144432 | A1* | 6/2013 | Canter | G07F 9/006 700/236 |
| 2014/0093171 | A1* | 4/2014 | Archuleta | G06V 30/224 235/375 |
| 2015/0088703 | A1* | 3/2015 | Yan | G06Q 10/087 705/28 |
| 2015/0104079 | A1* | 4/2015 | Czerny | G06K 15/021 382/112 |
| 2016/0171336 | A1* | 6/2016 | Schwartz | G06F 18/23 382/173 |
| 2016/0371634 | A1* | 12/2016 | Kumar | G06V 10/462 |
| 2016/0379367 | A1* | 12/2016 | Yasunaga | G06Q 10/087 382/103 |
| 2017/0124603 | A1* | 5/2017 | Olson | H04L 67/52 |
| 2017/0150092 | A1* | 5/2017 | Liu | G06V 20/52 |
| 2017/0178227 | A1* | 6/2017 | Graham | G06Q 30/0643 |
| 2017/0178310 | A1* | 6/2017 | Gormish | G06T 7/30 |
| 2018/0107999 | A1* | 4/2018 | Rizzolo | H04N 23/90 |
| 2019/0156276 | A1* | 5/2019 | Fisher | G06V 10/82 |
| 2019/0156277 | A1* | 5/2019 | Fisher | G06N 3/08 |
| 2020/0279113 | A1* | 9/2020 | Yanagi | B65G 1/1371 |
| 2020/0327557 | A1* | 10/2020 | Akgul | G06V 20/52 |

FOREIGN PATENT DOCUMENTS

| | | |
|---|---|---|
| WO | 2009027842 A2 | 3/2009 |
| WO | 2019017855 A1 | 1/2019 |

OTHER PUBLICATIONS

International Bureau, "International Preliminary Report on Patentability from PCT Application No. PCT/TR2017/050331", from Foreign Counterpart to U.S. Appl. No. 16/632,810, filed Jan. 30, 2020, pp. 1-7, Published: WO.

International Searching Authority, "International Search Report and Written Opinion from PCT Application No. PCT/TR2017/050331", May 22, 2018, pp. 1-9, Published: WO.

International Searching Authority, "International Search Report and Written Opinion from PCT Application No. PCT/TR2017/050620", Apr. 18, 2019, pp. 1 through 16, Published: WO.

Krizhevsky et al., "ImageNet Classification with Deep Convolutional Neural Networks", Advances in neural information processing systems, Jan. 2012, pp. 1-9.

Navarro, "A Guided Tour to Approximate String Matching", ACM Computing Surveys, Mar. 2001, pp. 31-88, vol. 33, No. 1, ACM.

Stanford University, "CS231n: Convolutional Neural Networks for Visual Recognition", 2017, pp. 1-6.

Wikipedia, "Statistical classification", page last edited Oct. 15, 2019, pp. 1-6, Wikipedia.

Yoruk et al., "An Efficient Hough Transform for Multi-Instance Object Recognition and Pose Estimation", at least as early as Sep. 12, 2016, pp. 1 through 6, Vispera Information Technologies, Istanbul, Turkey.

* cited by examiner

ELECTRONIC DETECTION OF PRODUCTS, POSES OF PRODUCTS, AND ARRANGEMENT OF PRODUCTS IN A DISPLAY STRUCTURE, ELECTRONIC SCORING OF THE DETECTED PRODUCT POSES AND PRODUCT ARRANGEMENT, AND ELECTRONIC GENERATION OF A REFERENCE IMAGE OF A PRODUCT IN ITS CANONICAL POSE This application claims priority to International Patent Application No. PCT/TR2017/050620 filed on Dec. 1, 2017.

SUMMARY

Marketing research has shown that the types and the arrangement of products in a display structure affect the sales of the displayed products individually and as a group.

Referring to FIG. 1, consider a display structure 10 of stacked supermarket shelves 12, which hold packaged (e.g., in a carton or bottle) beverages 14 such as juices, sodas, non-dairy milk substitutes, and teas. Although not shown in FIG. 1, each beverage location can be more than one beverage deep; that is, there can be a respective horizontal "stack" or "column" of beverages 14 behind each of the displayed (front-most) beverages.

The beverages 14 may sell better if the label of the respective beverage in the front of each column is properly posed (e.g., upright, facing straight ahead) and if none of the columns are empty or otherwise have no beverage in the front-most location of the column.

Furthermore, the beverages 14 (e.g., teas, healthy juices, non-dairy milk substitutes) targeted for health-conscious adults may sell better if disposed on higher ones of the shelves 12, and the beverages targeted for children (e.g., soda and other sugary drinks) may sell better if disposed on lower ones of the shelves, because the higher shelves are at adult eye level and the lower shelves are at child eye level.

Moreover, the arrangement of the beverages 14 (e.g., by types, brands, sizes, prices) on each shelf 12 can affect sales of the beverages on that shelf. For example, the location of a store-brand beverage 14 relative to the location of a national-brand beverage on a shelf 12 can affect the sales volume of both the store-brand and the national-brand beverages on that shelf. That is, a particular arrangement of the store-brand and the national-brand beverages on a same shelf 12 can maximize the volumes of sales for both brands on that shelf.

In addition, the arrangement of the beverages 14 (e.g., by types, brands, sizes, prices) on a group of shelves 12 can affect the sales of the beverages on those shelves. For example, whether one size of a beverage 14 is above or below another size of the same or a different beverage can affect the volume of sales of both beverages.

Understanding the above-described market research, companies (e.g., Pepsi®, Coca-Cola®, Minute Maid®, and Tropicana®) that produce and market products typically have strict guidelines regarding product placement within a display structure, the frequency with which the display structure should be checked for compliance with the guidelines, and the frequency with which detected non-compliance problems should be corrected. Examples of such non-compliance problems include an empty product column, a customer moving a product to an incorrect location, an improperly posed product, and a damaged product, and examples of corrections of such problems include restocking the empty column, rearranging the products in a specified placement, properly posing the products, and replacing damaged products.

To ensure that product vendors (e.g., markets, supermarkets, grocery stores, department stores) implement and follow all of its guidelines, a product company typically employs one or more field agents or auditors that travel around to product-vendor venues in respective geographic areas, and that periodically make "surprise" inspections of vendors' display structures that hold the company's products. Differences between a field agent and an auditor include that a field agent is typically an employee of the product company whereas an auditor is typically an employee of a third-party audit or market-research firm hired by the product company, and that a field agent typically requests a vendor to correct discovered problems "on the spot" whereas an auditor typically notes discovered problems but forgoes requesting the vendor to correct the discovered problems, at least until after the auditor returns to his/her home office. In short, an auditor is typically responsible only for determining and reporting a product vendor's compliance with a product company's guidelines, whereas a field agent is typically responsible for ensuring that a product vendor complies with the product company's guidelines. For clarity, only field agents are referred to hereinafter, it being understood that a similar discussion may apply to auditors or other professionals whose duties include monitoring and rating product displays.

During a visit (typically unannounced) to a product vendor's venue, a field agent typically inspects the display structures in which the product company's products are being displayed. During the inspection, the field agent typically notes factors, such as those described above in conjunction with FIG. 1, that can affect sales of the company's products, and generates a rating that indicates how closely the venue is complying with the product company's guidelines. In addition to the rating, the field agent may also report on items such as product counts, shelf shares (i.e., how many locations a particular product or brand occupies on a shelf), and product positions within a display structure.

Based on the rating, the field agent, or a marketing agent back at the product company's headquarters, can provide valuable and constructive feedback to the manager of the venue, and, more generally, to the product vendor.

Furthermore, the product company can base incentives (e.g., lower prices to the vendor for the company's products) or penalties (e.g., ceasing to use the vendor to sell the company's products) to the vendor on the field agent's rating.

Unfortunately, there are problems associated with using field agents to rate product vendors' compliance with a product company's product-display guidelines.

Because a field agent typically is responsible for visiting and rating product-vendor venues in a relatively large geographical area or territory (e.g., all of California north of San Francisco, the Pacific Northwest states of Washington, Oregon, and Idaho), the expenses (e.g., transportation, lodging, meals) that the field agent incurs can be significant.

Furthermore, because of the large number (e.g., 100-200) of product-vendor venues in a field agent's territory, the field agent may be able to visit and rate each venue in his/her territory only up to a few (e.g., 1-2) times per month.

A possible technique for increasing the frequency at which a product company can rate each product-vendor venue that carries the company's products is as follows. First, a person (e.g., an employee of the vendor) at a particular venue uses a device (e.g., a smart phone) to capture one or more images of each display structure and the products in the structures. Next, the person uploads the one or more images to a server. Then, an agent of the product company analyzes the one or more images, and rates the product vendors' compliance with the product company's product-display guidelines based on the image analysis.

Although the latter-described technique can reduce or eliminate the travel and other expenses incurred by field agents, this technique still requires the use of agents and the payment of their wages. Furthermore, while viewing a number of images each day, an agent may become fatigued, and, therefore, may make fatigue-induced errors in the analysis of the images and in determining his/her ratings of product-vendor venues. Moreover, this technique does not yield results in real time.

Therefore, a need has arisen for technical solution that rates product-vendor venues for compliance with the company's product-display guidelines more frequently than field agents can rate product-vendor venues yet without the expense and error rate of field agents, and that can provide the rating and other related information and results in real time.

In an embodiment, such a need is fulfilled by an electronic processing system that includes an image-processing circuit, a pose circuit, and a score circuit. The image-processing circuit is configured to receive a captured image of at least one product disposed in a display structure, and to identify, in real time, each of the at least one product in the captured image. The pose circuit is configured to determine, in real time, a respective pose of each of the at least one product, and to compare, in real time, the respective pose of each of the at least one product to a respective canonical pose of each of the at least one product. And the score circuit is configured to generate, in real time, a pose score in response to a respective comparison for each of the at least one product, and other related information and results.

For example, such an electronic processing system can be configured to detect a respective improper pose of one or more products, and to generate a pose score that is related to the number of improper poses detected, and to the average "distance" between each detected improper pose and the product's respective canonical pose (i.e., the desired pose, such as a pose in which the product label is facing straight out from the product-display structure).

In another embodiment, an electronic processing system includes an image-processing circuit and a reference-image circuit. The image-processing circuit is configured to receive captured images of a product, and to identify neighbor pairs of the captured images. And the reference-image circuit is configured to identify a group of identified neighbor pairs of the captured images, the group including a largest number of the captured images compared to other groups of identified neighbor pairs of the captured images, to identify one of the captured images in the identified group as an image representative of a canonical pose of the product, and to convert the representative image into a reference image.

For example, such an electronic processing system can be configured to generate a reference image of a product in its canonical pose(s) from other images of the product (even images of the product in poses other than its canonical pose(s)) without the need to conduct an expensive and time-consuming photo shoot of the product in its one or more canonical poses.

And as described below, an embodiment of such an electronic processing system incorporates improvements over currently available technology. For example, the image-processing circuit can be configured to implement newly developed image-processing techniques that allow the image-processing circuit to identify products within a display structure in real time. Furthermore, the pose circuit can be configured to implement newly developed image-processing and image-analysis techniques that allow the pose circuit to determine a pose of an identified product in real time. Moreover, the score circuit can be configured to implement newly developed techniques to score each pose, and to score the overall product display based on the poses of multiple products within the display, in real time. In addition, a product-arrangement circuit can be configured to implement newly developed image-processing and image-analysis techniques that allow the product-arrangement circuit to determine an arrangement, i.e., a realogram, of the identified products, to compare the determined arrangement to a product-arrangement template, i.e., a planogram, and to detect and identify one or more errors in the determined realogram in real time. Furthermore, a reference-image circuit can be configured to implement newly developed image-processing techniques to generate a reference image of a product in one its canonical poses from other images of the product captured while the product is in a vendor's product-display structure, even from other images of the product in non-canonical poses.

DRAWINGS

Figure 6:
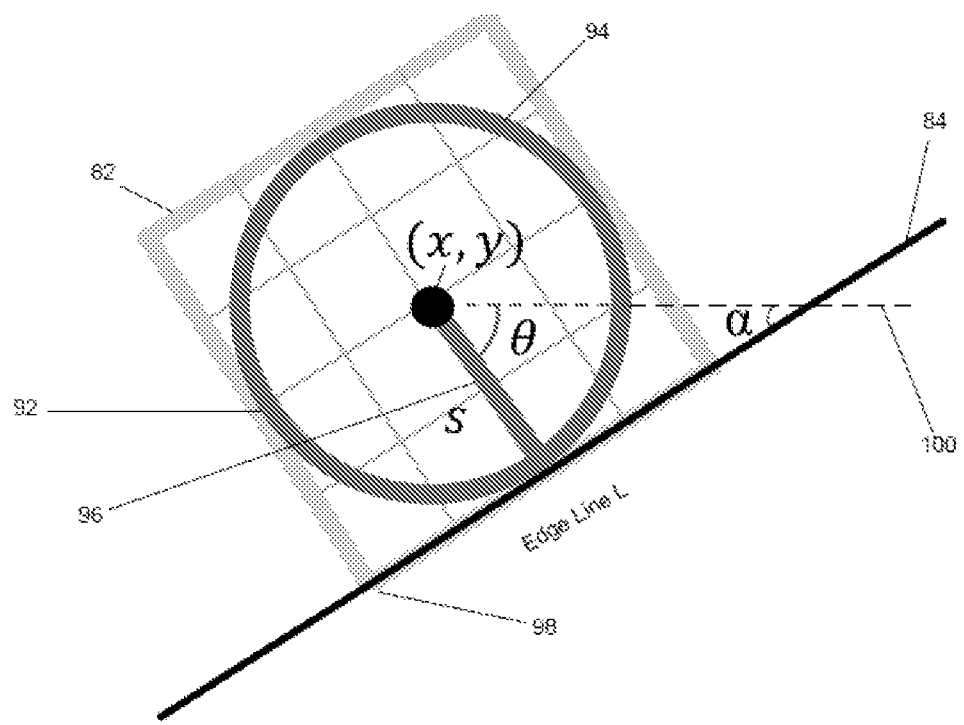
FIG. 6 is a diagram of a key region of an image, according to an embodiment.
Figure 7:
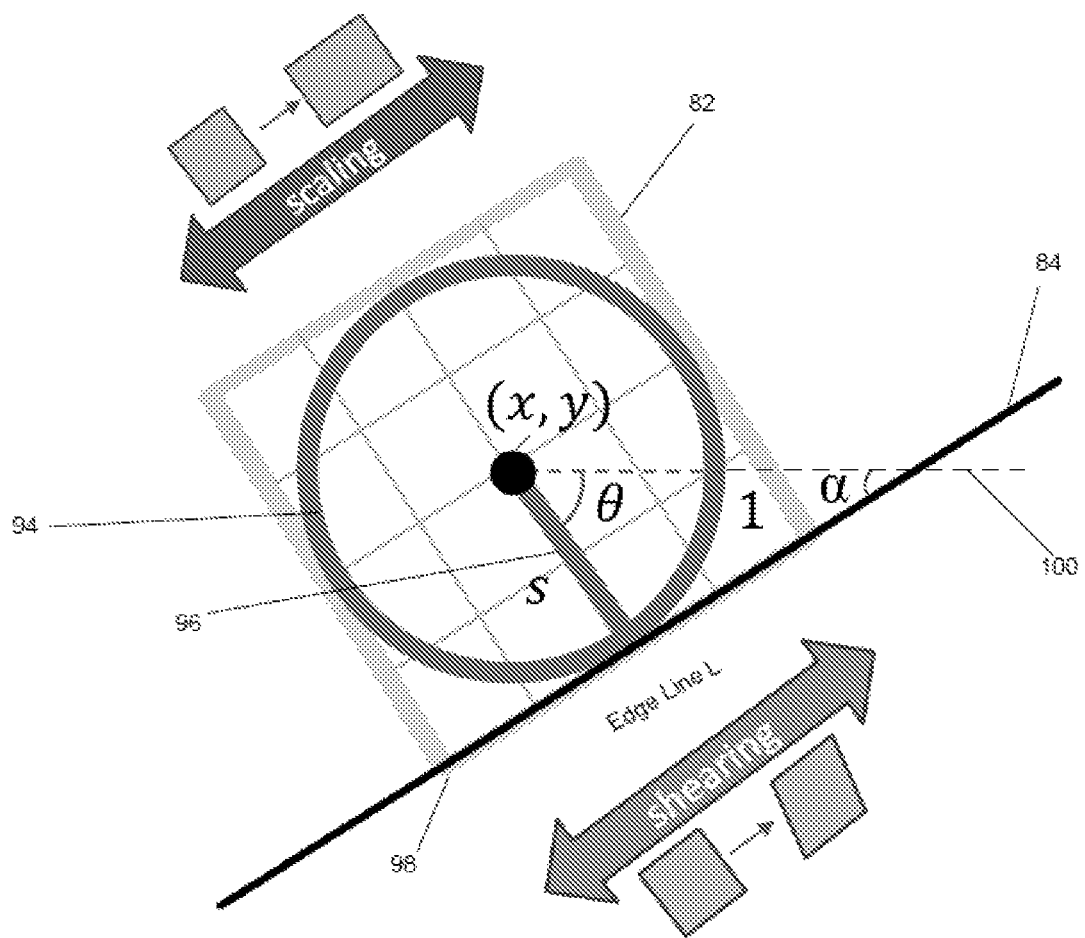

FIG. 7 is a diagram that demonstrates that the descriptor corresponding to the key region of FIG. 6 remains valid even if the key region described by the descriptor undergoes unidimensional scaling in a dimension parallel to an edge line of the key region, shearing in a dimension parallel to the edge line, or both unidimensional scaling and shearing in a dimension parallel to the edge line, according to an embodiment.

Figure 8:
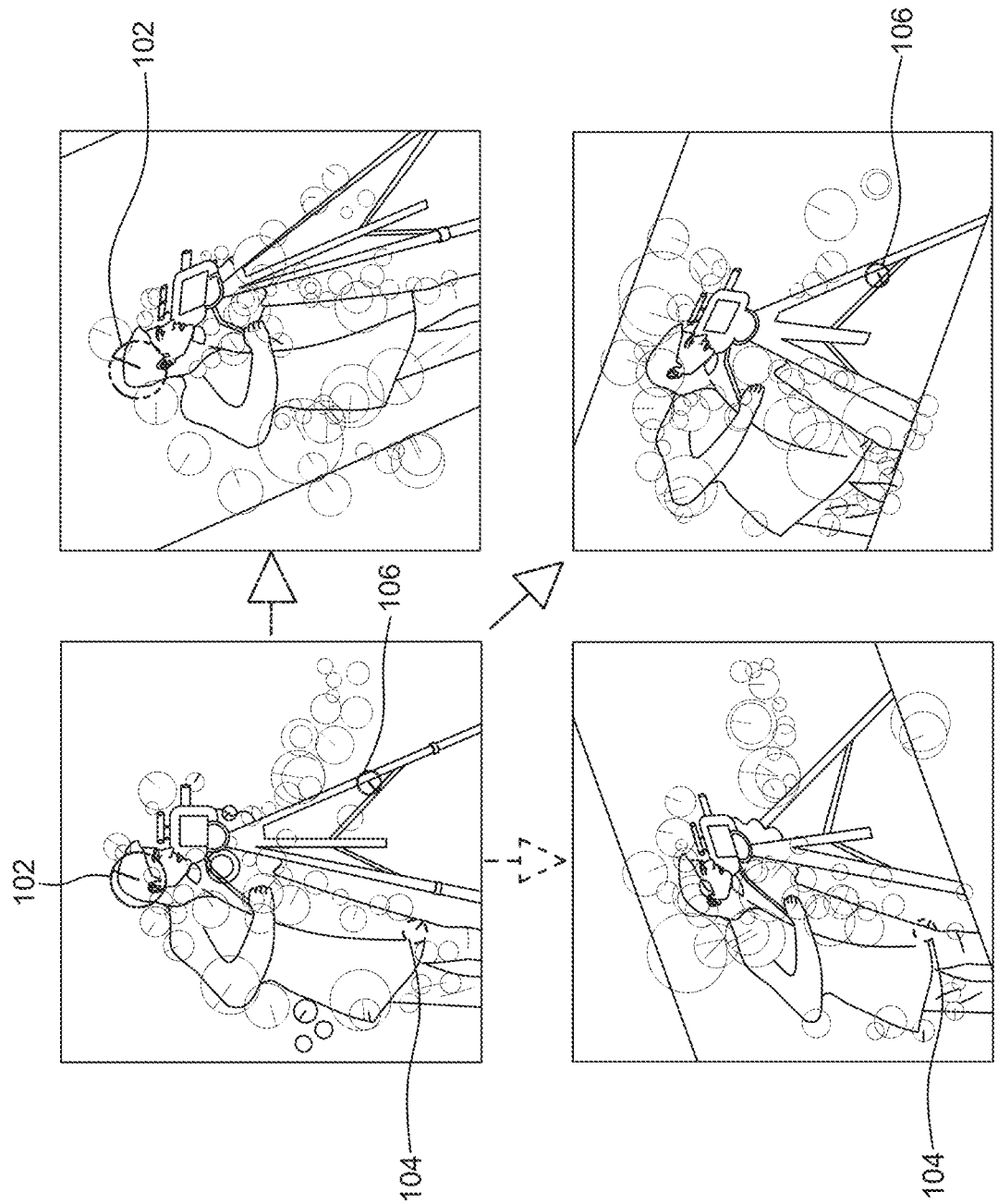

FIG. 8 includes versions of an image, the versions representing unidimensional scaling and shearing parallel to the edge lines of respective key regions, the versions demonstrating that a descriptor corresponding to a key region remains valid even if the key region described by the descriptor undergoes a unidimensional scaling parallel to an edge line of the key region, a shearing parallel to the edge line, or both unidimensional scaling and shearing parallel to the edge line, according to an embodiment.

Figure 9:
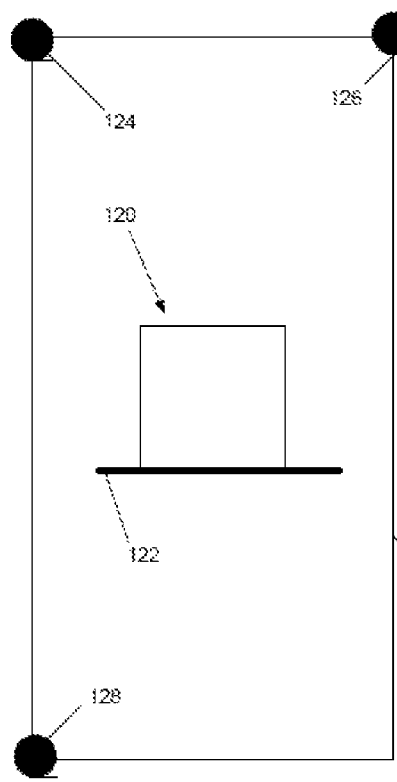

FIG. 9 is a diagram of a reference image of a product in its canonical pose, the reference image including a key region and anchor points, according to an embodiment.

Figure 10:
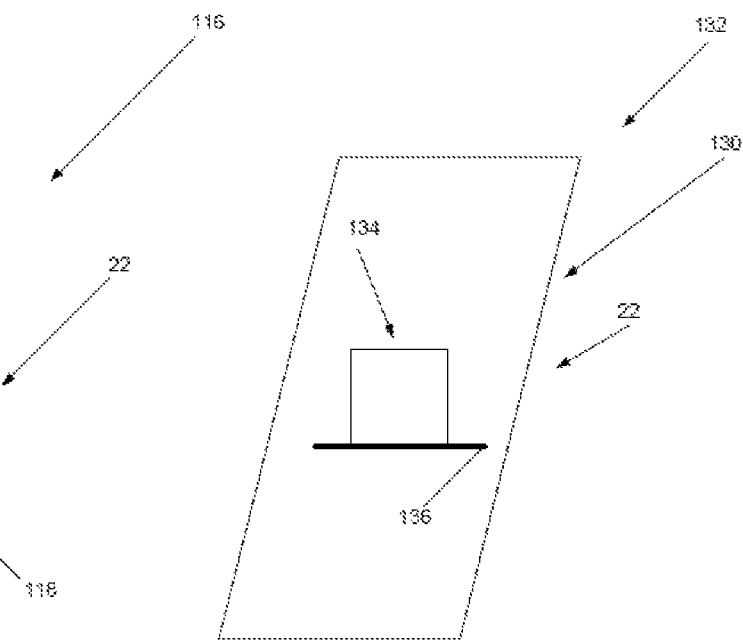

FIG. 10 is a diagram of a portion of a captured image, the captured-image portion being of a product, including a key region having a descriptor that matches the descriptor of the key region of FIG. 9, and having undergone shearing in a dimension parallel to the edge line of the key region, according to an embodiment.

Figure 11:
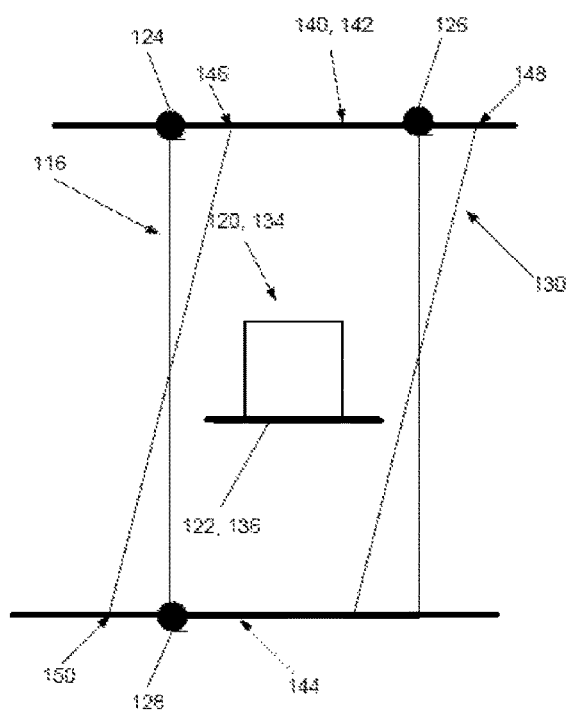

FIG. 11 is a diagram of the reference image of FIG. 9 transformed to overlay the captured-image portion of FIG. 10, according to an embodiment.

Figure 12:
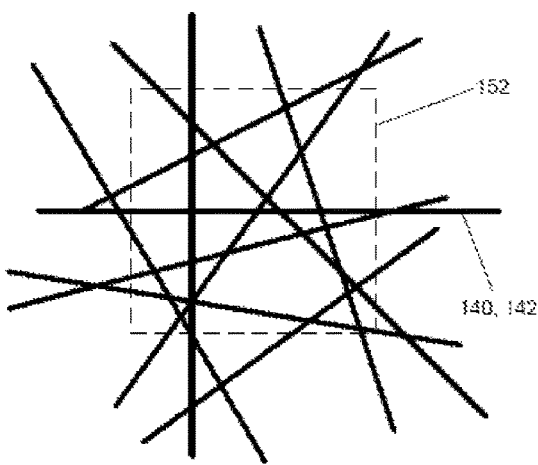

FIG. 12 is a diagram of an anchor region of the captured-image portion of FIGS. 9 and 11, the anchor region being where an anchor point of the captured-image portion is located as evidenced by the anchor lines intersecting the region, according to an embodiment.

Figure 13:
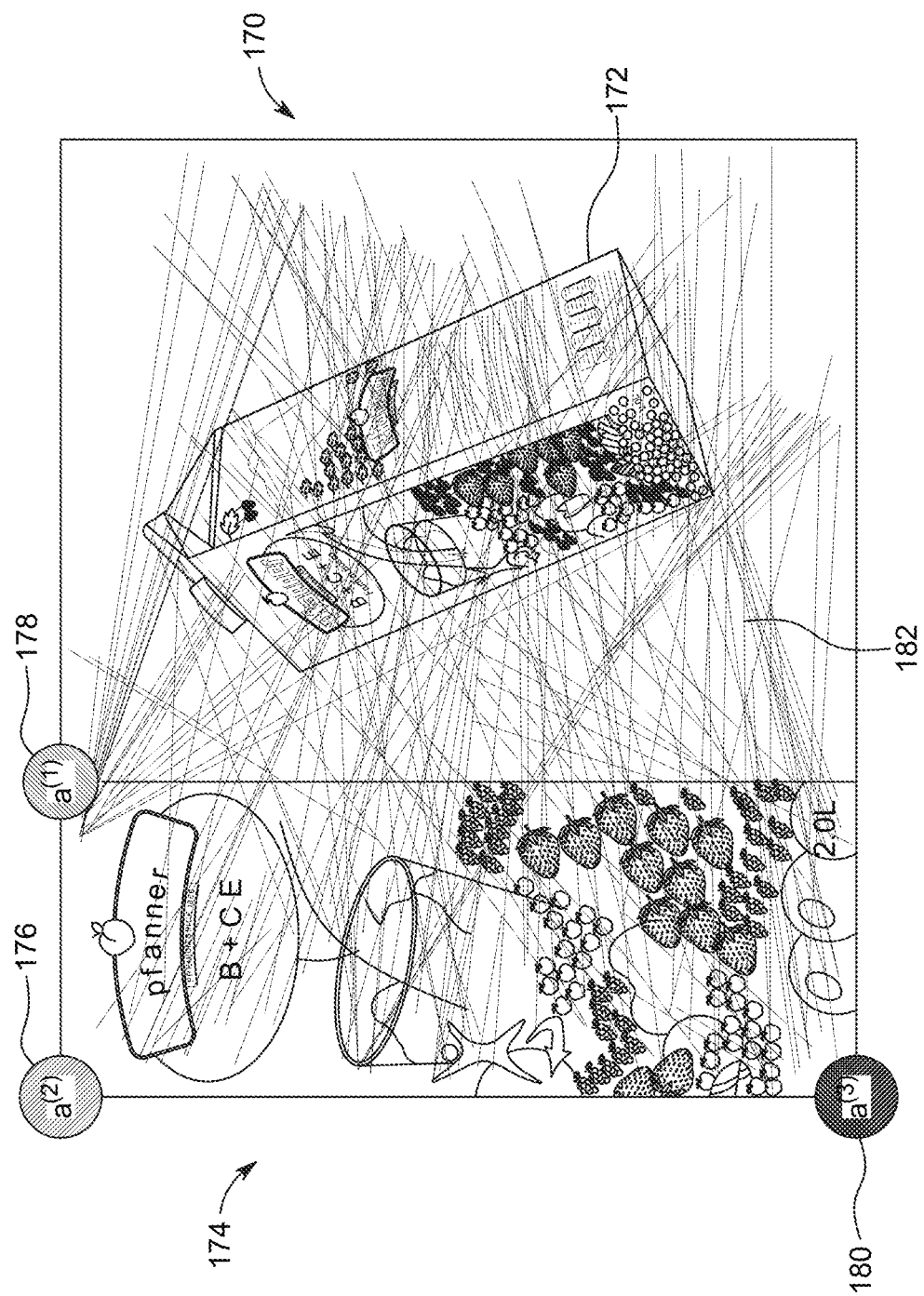

FIG. 13 is a diagram of a reference image (left image) of a product, a captured image (right image) of the same product, descriptor matches between the reference and captured images, and anchor points of the reference image, according to an embodiment.

Figure 14:
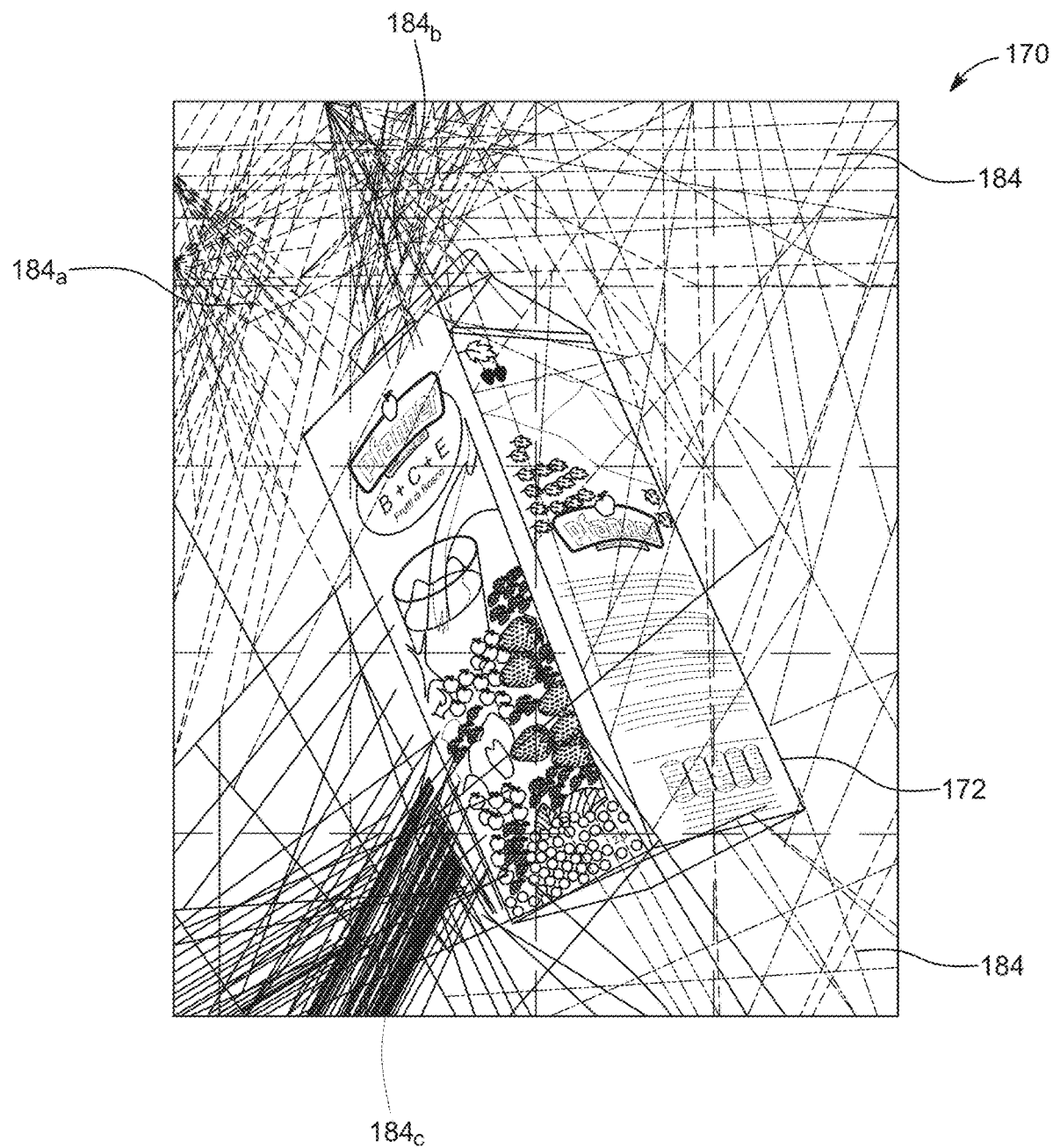

FIG. 14 is a diagram showing the most likely anchor regions of the captured image of FIG. 13, according to an embodiment.

Figure 15:
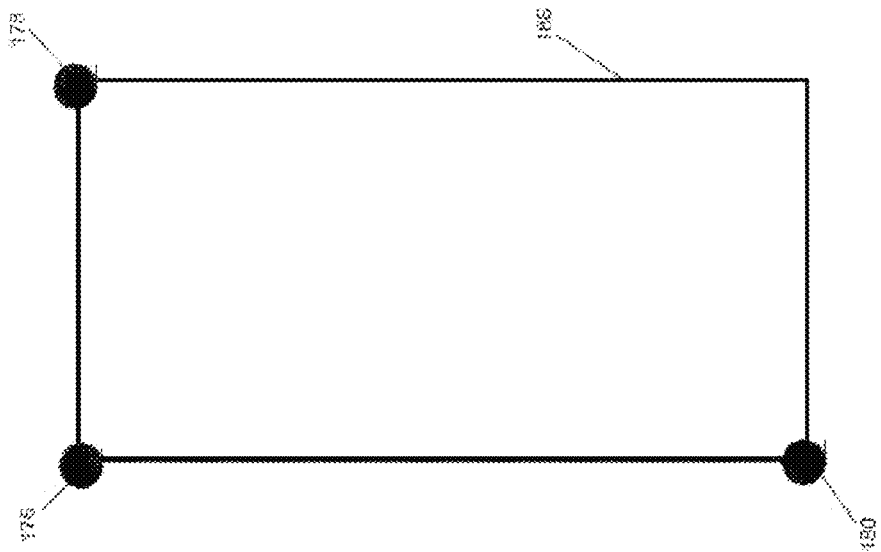

FIG. 15 is an anchor-point template for a canonical pose of the product in the captured image of FIG. 13, according to an embodiment.

Figure 16:
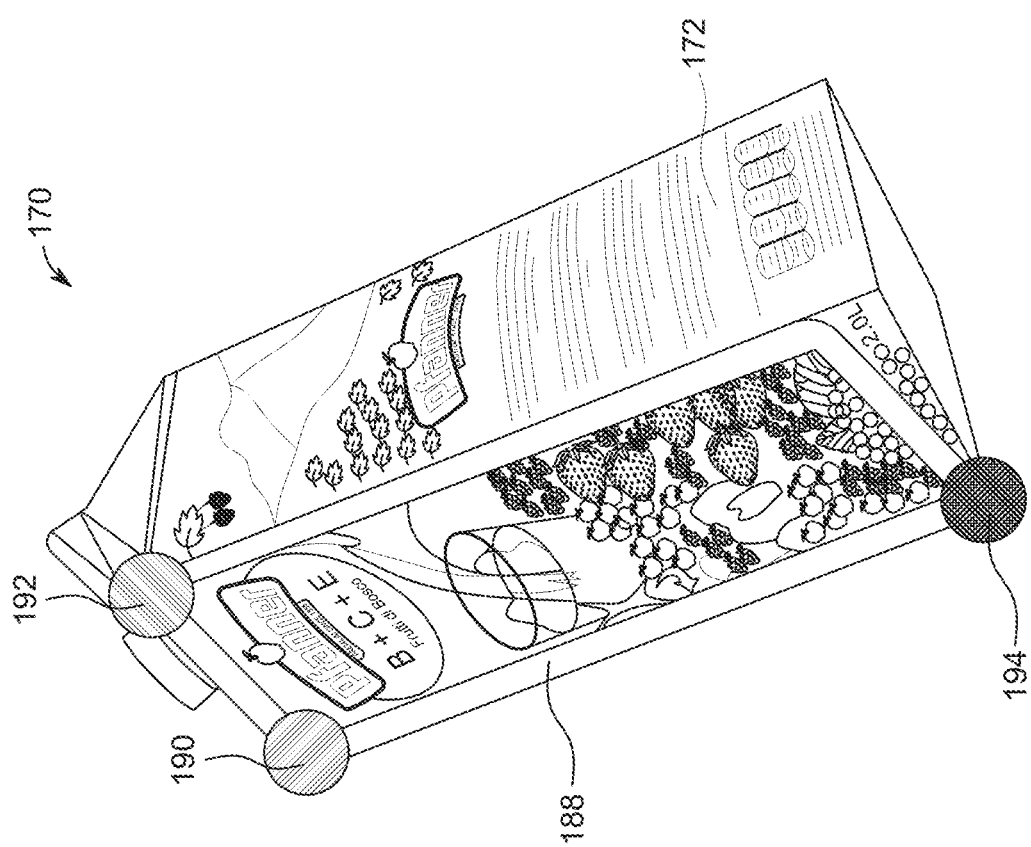

FIG. 16 is the captured image of FIG. 13 with the image's most likely anchor points, according to an embodiment.

Figure 17:
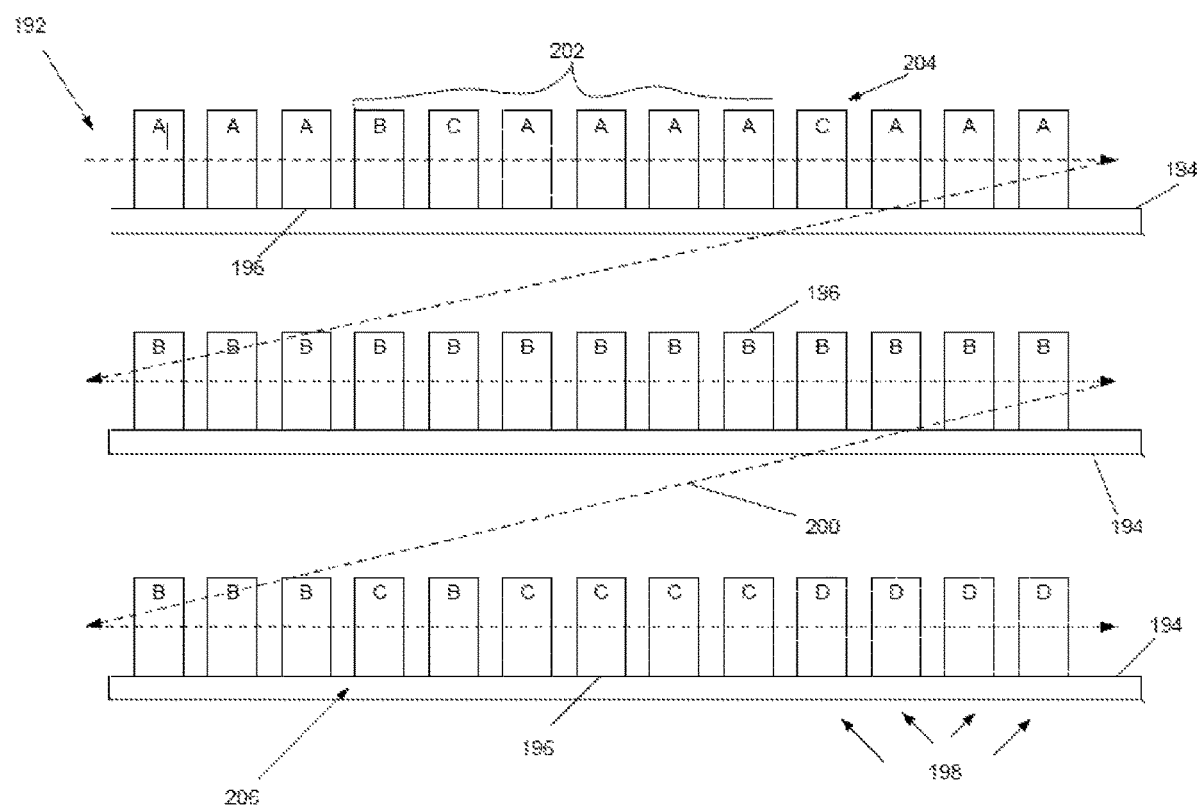

FIG. 17 is a diagram of products in a shelf display structure overlaid with a vector representing the linear arrangement of the products, according to an embodiment.

Figure 2:
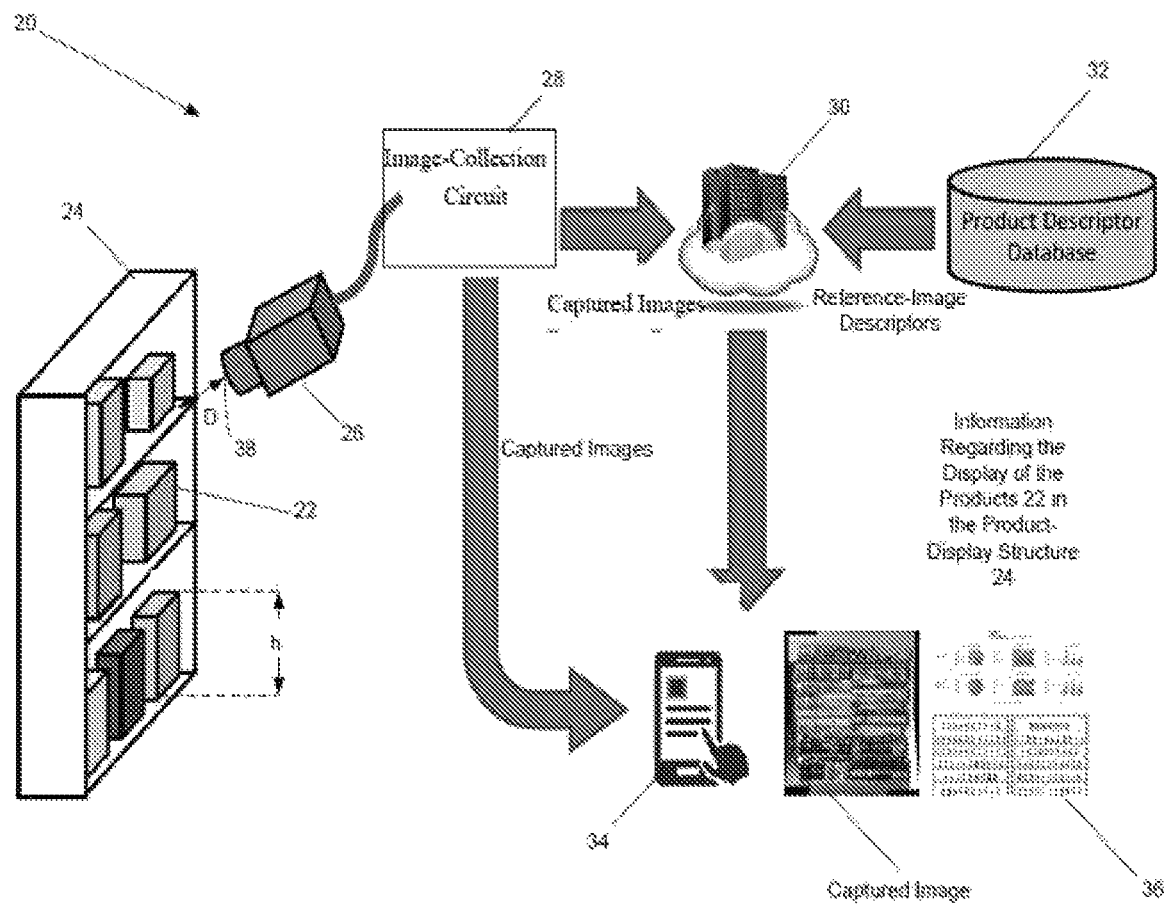
FIG. 2 is a diagram of a product-display structure and an electronic system for analyzing and scoring the presentation of the products within the display structure, according to an embodiment.
Figure 18:
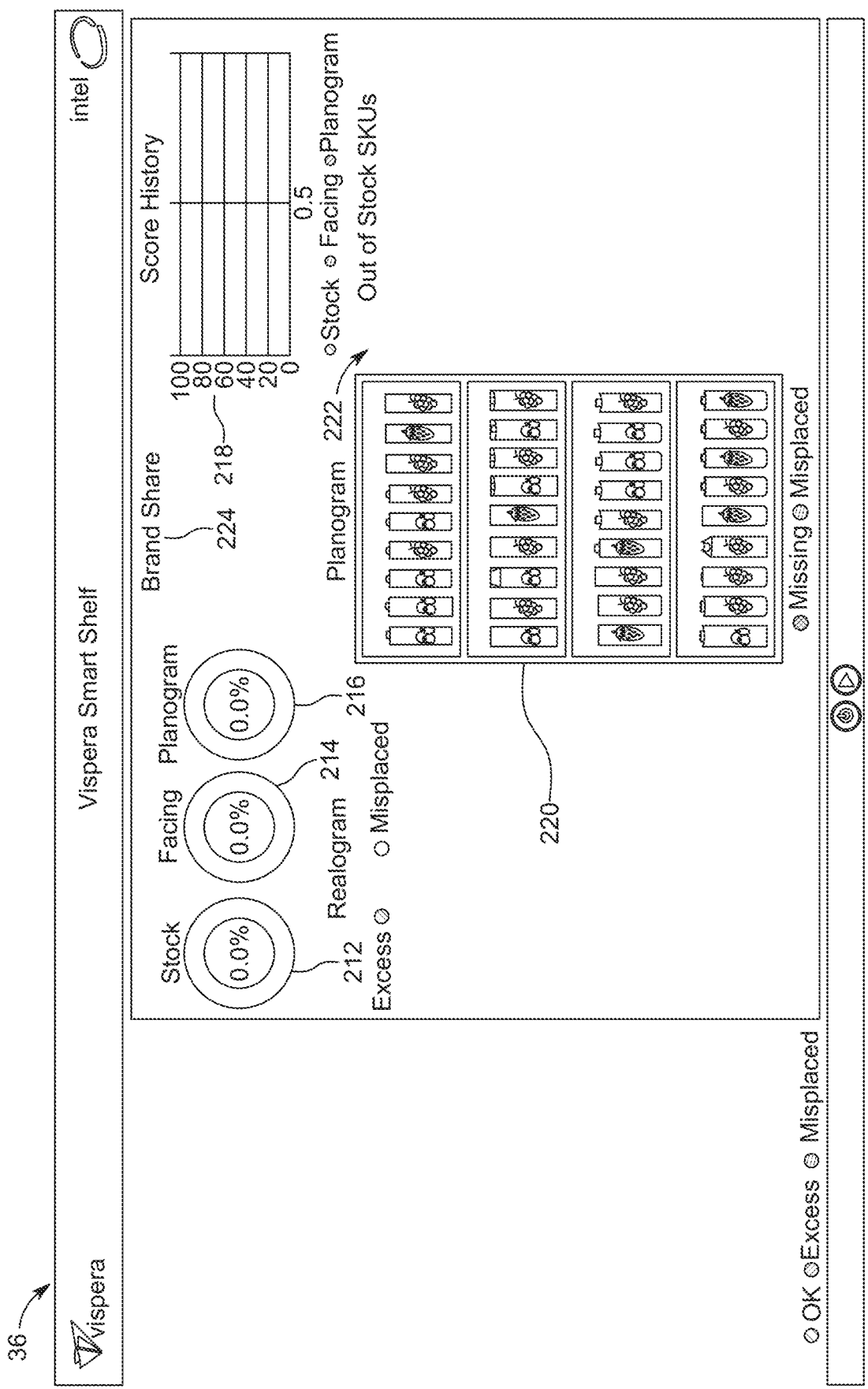

FIG. 18 is a dashboard that the electronic system of FIG. 2 generates, the dashboard including information that the system of FIG. 2 electronically determined regarding products in a display structure, according to an embodiment.

Figure 19:
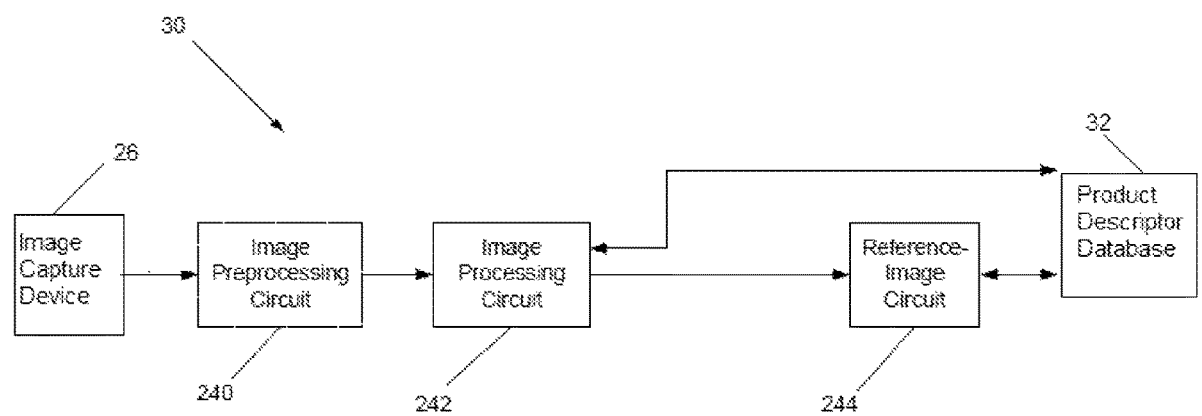

FIG. 19 is a diagram of the electronic processing circuit of FIG. 2, according to another embodiment.

Figure 20:
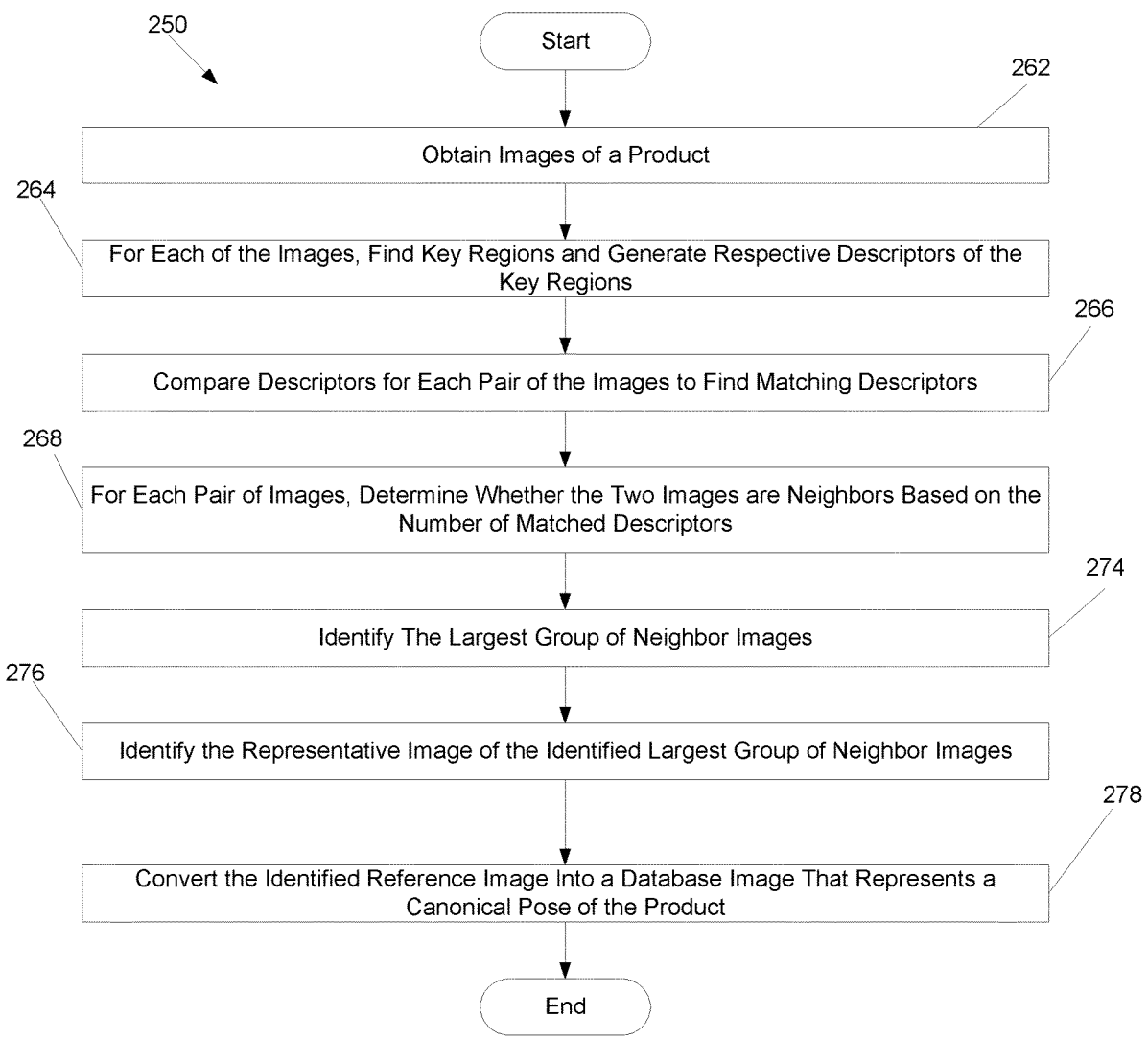

FIG. 20 is a flow diagram of the operation of the electronic processing circuit of FIG. 19, according to an embodiment.

Figure 21:
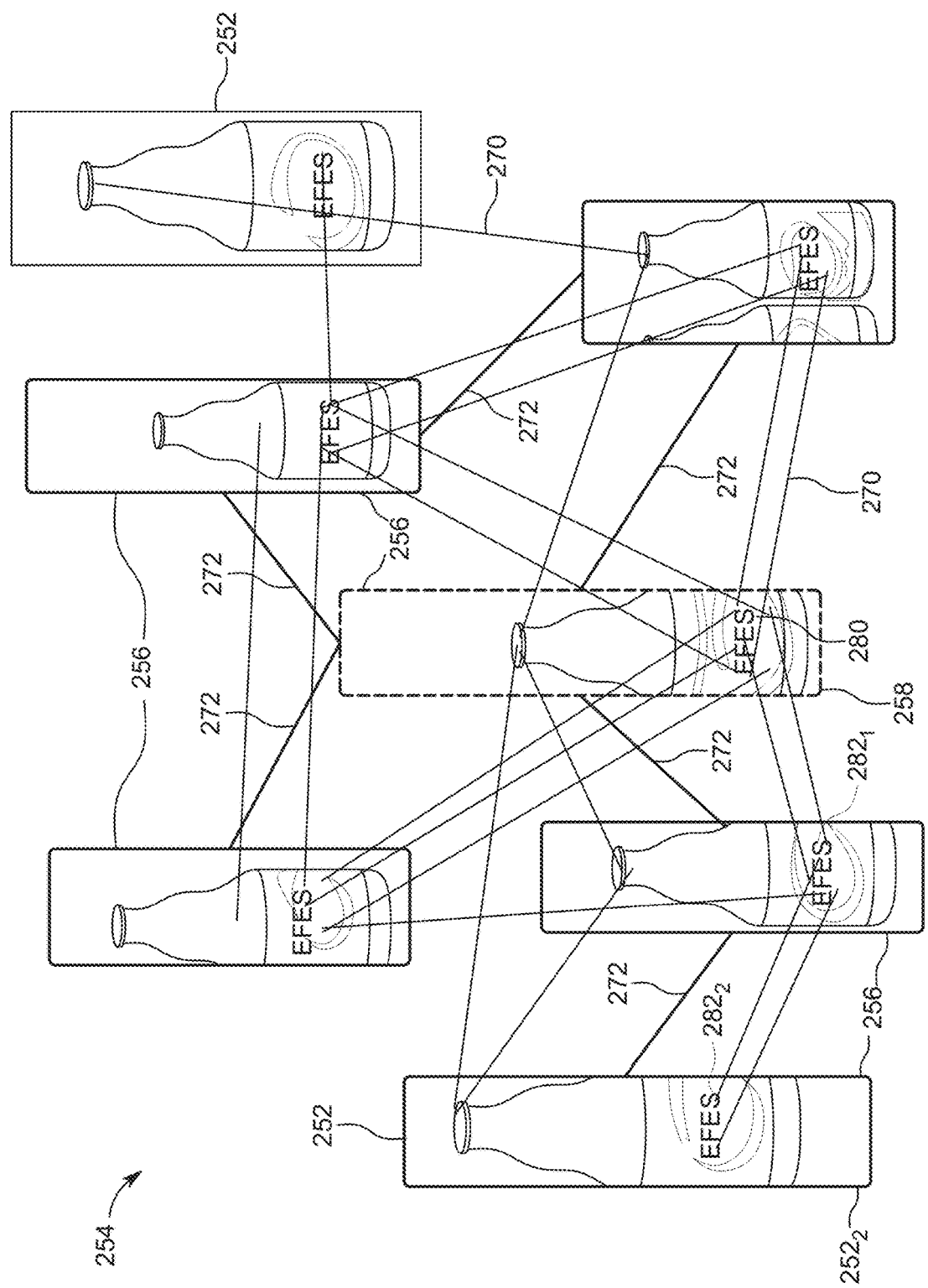

FIG. 21 is a diagram of a group of "neighbor" images including an image representative of a product in its canonical pose, according to an embodiment.

Figure 22:
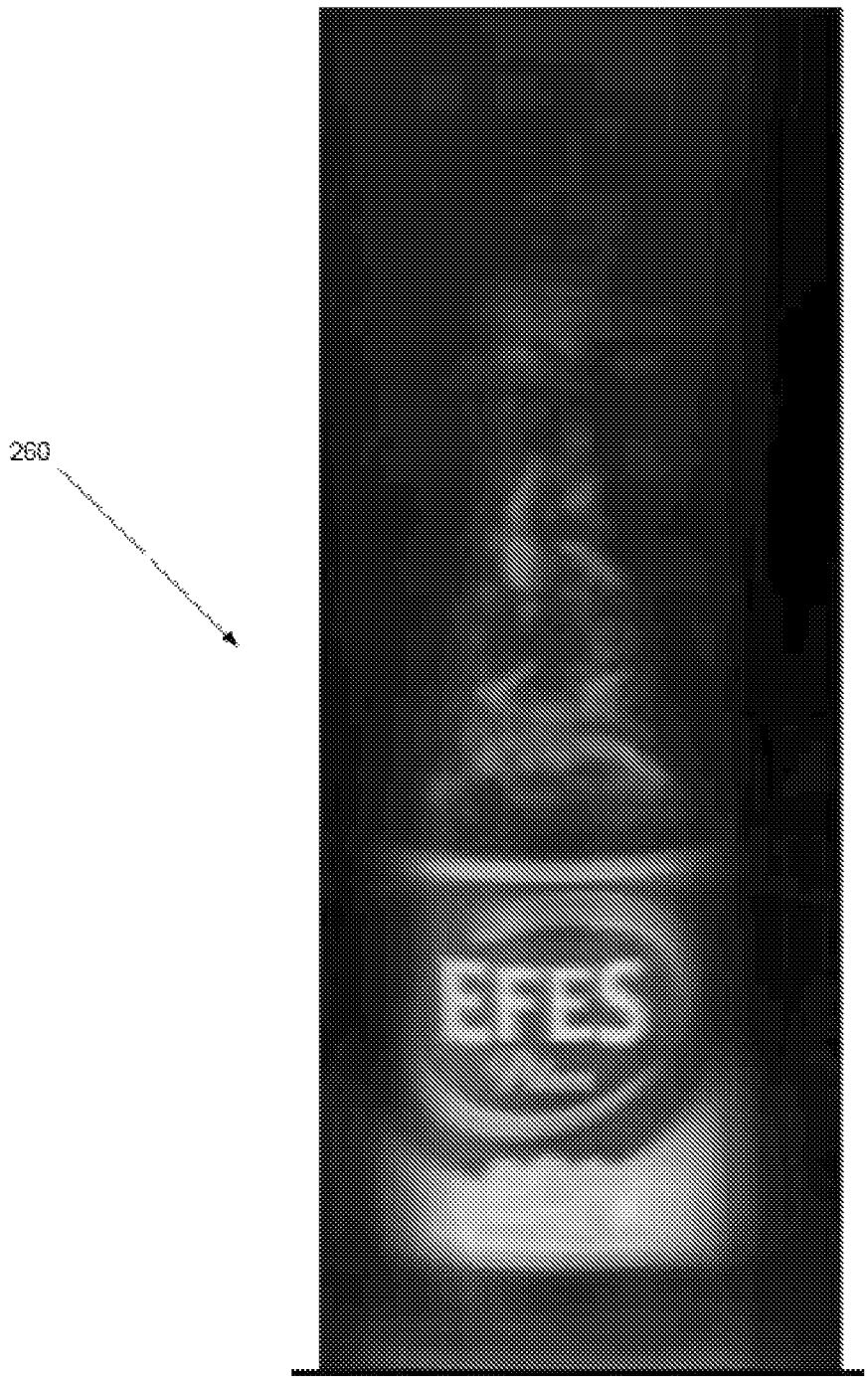

FIG. 22 is a diagram of a reference image that the electronic processing circuit of FIG. 19 generated from the group of "neighbor" images of FIG. 21, according to an embodiment.

DETAILED DESCRIPTION

Each non-zero value, quantity, or attribute herein preceded by "substantially," "approximately," "about," a form or derivative thereof, or a similar term, encompasses a range that includes the value, quantity, or attribute ±20% of the value, quantity, or attribute, or a range that includes ±20% of a maximum difference from the value, quantity, or attribute. For example, "two planes are substantially parallel to one another" encompasses an angle $-18° \leq \alpha \leq +18°$ between the two planes ($|90°|$ is the maximum angular difference between the two planes, ±20% of $|90°|$ is ±18°, and the two planes are parallel to one another when $\alpha=0°$). For a zero-value, the encompassed range is ±1 of the same units unless otherwise stated. And for a range of values, the encompassed range is the stated range ±20% of the difference between the high and low ends of the stated range. For example, if the stated range is 10-30, then the encompassed range is 10 minus 20% of 20 to 30 plus 20% of 20, and is, therefore, 6-34.

FIG. 2 is a diagram of an electronic system 20, which is configured, e.g., to detect and to identify products 22 within a product-display structure 24, to determine the poses of the identified products, to identify a product location lacking any product and to determine the product that is missing from the location, to determine an arrangement, i.e., a realogram, of the identified products within the display structure, and to rate or score the product display (e.g., determined product poses, determined product arrangement) for compliance with a product company's product-display guidelines, according to an embodiment.

The electronic system 20 includes an image-capture apparatus 26, an image-collection circuit 28, an electronic processing system 30, and an electronic database 32.

FIG. 2 also includes an electronic rendering device 34, such as a smartphone or other computing device, to which the electronic system 20 sends product-display information for consumption by another computer system, or by a person such as a field agent, product manager, or supervisor of a product company that has one or more products 22 in the product-display structure 24. For example, the electronic system 20 can be configured to generate, in real time, a dashboard 36 for visually conveying the product-display information on a display screen of the electronic device 34, and can be configured to update the dashboard in real time.

The image-capture apparatus 26 is located at a product vendor's venue, and includes one or more image-capture devices (e.g., digital still camera, digital video camera) configured to acquire images of products 22 in one or more product-display structures (e.g., refrigerator, freezer, and open-air shelves, and refrigerator and freezer bins) such as the display structure 24 (here shelves) and to upload the acquired images to the image-collection circuit 28, which is also typically located at the product vendor's venue. The image-capture apparatus 26 can be configured (e.g., programmed) to capture and to upload images of the products 22 in the product-display structure 24 automatically and periodically, or in response to a command from the image-collection circuit 28 or from the electronic processing system 30. For example, such a command may cause the image-capture apparatus 26 to capture and to upload a continuous stream of video images.

Furthermore, the image-capture apparatus 26 can be mounted to, e.g., a wall or ceiling (not shown in FIG. 2) of the product vendor's venue in a fixed fashion or in a moveable fashion. If the image-capture apparatus 26 is mounted in a moveable fashion, then the image-collection circuit 28 or the electronic processing system 30 can control a motor or other mechanism (not shown in FIG. 2) to move the image-capture apparatus into one or more desired positions. For example, the image-collection circuit 28 or the processing system 30 can direct an aperture 38 of the image-capture apparatus 26 back and forth between two or more product-display structures 24 so that the processing system 20 can use a single image-capture apparatus to capture images of more than one product-display structure.

Moreover, the image-capture apparatus 26 is positioned such that a distance D between the aperture 38 and the product-display structure 24 is much greater than the largest dimension h of a largest product 22 in the product-display structure. For example, if a cereal box is the largest product 22 in the product-display structure 24 and has a height h=0.30 meters (m), then the distance D>>0.30 m, e.g., D is in an approximate range of $3.0 \text{ m} \leq D \leq 10.0 \text{ m}$. As described below, setting D>>h allows a designer of the system 20 to make certain assumptions during processing of the captured images of the products 22 in the product-display structure 24. If the aperture 38 of the image-capture apparatus 26 is mounted away from the product-display structure 24 by a distance D that is large enough for the entire product-display structure to "fit" within each image that the image-capture apparatus captures, then the distance D typically satisfies the criterion D>>h.

The image-collection circuit 28 is configured to receive, from the image-capture apparatus 26, the captured images of the products 22 in the product-display structure 24, to select some of the captured images for further processing, and to forward the selected images to the electronic processing system 30. For example, the image-collection circuit 28 can be configured to screen out captured images that include one or more customers or vendor personnel (not shown in FIG. 2) standing in front of the product-display structure 24, and images that show no change in the products 22 displayed as compared to one or more previous images of the same products (no change indicates that an analysis of one of the previous images is still valid). The image-collection circuit 28 can be configured to perform this image-screening-and-selection process by implementing conventional image-processing techniques. For example, the image-collection circuit 28 can be configured to detect a change in the products 22, and to detect the location of the change, by conventionally comparing each pair of consecutively captured images on a pixel-by-pixel basis, and by detecting a product change at a particular location for which the comparison yields a difference (e.g., a difference in luminance) that exceeds a threshold. Furthermore, the image-collection circuit 28 can be configured to upload the selected captured images, or all of the captured images, to the database 32, to the client device 34, or to both the database and the client device. Moreover, in addition to being configured to control the position of the image-capture apparatus 26 as described above, if the image-capture apparatus is a camera, then the image-collection circuit 28 can be configured to adjust one or more of, e.g., the zoom, focus, f-stop, contrast, brightness, color temperature, and color balance of the camera. For example, the image-collection circuit 28 can be configured to adjust camera zoom, position, f-stop, and focus by directing the camera to a calibration object of a size, shape (e.g., rectangular), and distance that is "known" to the camera, and by adjusting, in a conventional manner, the zoom, position, and focus so that the in-focus object fills a predetermined region of the captured image. In addition, the electronic image-collection circuit 28 can be, or can include, a programmable computing circuit such as a microprocessor or microcontroller, circuitry (e.g., a field-programmable gate array (FPGA)) configurable with firmware or another stream of data, an application-specific (hardwired) integrated circuit (ASIC), or a combination or subcombination of any these types of circuits. And this programmable computing circuitry can be a component of a local or cloud computer server or other computing device such as a laptop, desktop, tablet, smart phone, or tower computer. Alternatively, the electronic processing system 30 can be configured to perform, in a conventional manner, the image-screening-and-selection process on the captured images received from the image-collection circuit 28.

The electronic processing system 30 is configured to analyze the captured images that it, or the image-collection circuit 28, selects to yield, in real time, one or more of the following items of information regarding the displayed products 22: the identities of the front-most products within the display structure 24, the poses of the identified products, the identity of any product locations that contain an unidentified product or that lack any product (i.e., that are "empty") and the identity of the respective product that should be disposed in each such location, the arrangement of the identified products within the display structure, an indication of how well the product display (e.g., determined product poses, determined product arrangement) complies with a product company's product-display guidelines, and a respective indication of each detected problem (e.g., unidentified product, empty product location, improperly posed product, improperly arranged products) and a respective solution to each problem (e.g., which product should be stocked in an empty location, which products have poses so different from the canonical poses that the products need to be reposed).

The electronic processing system 30 is also configured to generate and to update, in real time, the displayable dashboard 36 of the product-display information that the processing system determined, and to provide the displayable dashboard to the client device 34 for real-time display to a user, such as a field agent of a product company having at least one product 22 in the product-display structure 24.

And the electronic processing system 30 can be, or can include, a programmable computing circuity such as a microprocessor or microcontroller, circuitry (e.g., a field-programmable gate array (FPGA)) configurable with firmware or another stream of data, application-specific (hardwired) integrated circuitry (ASIC), or a combination or subcombination of any these types of circuits. And this programmable circuitry can be a component of a local or cloud computer server or other computing device such as a laptop, desktop, tablet, smart phone, or tower computer.

The product-descriptor database 32 includes one or more memory devices (e.g., hard-disk drive, solid-state drive, volatile memory (e.g., RAM), non-volatile memory (e.g., FLASH drive), and optical disk) configured to store captured images of the products 22 in the product-display structure 24, and to store references images of the products, key points and key regions of the reference images, and descriptors of these key regions. Each reference image is of a respective product 22 in one of its canonical poses (a product company's product-display guidelines typically identify only one canonical pose per product). For example, a product's canonical pose can be of the product with its label facing directly forward, i.e., toward the front of the product-display structure 24, because marketing researchers have discovered that sales of a product 22 are better if the product is displayed with its label facing directly forward, as opposed to the label being turned, or skewed, to one side or the other of the product, or, in a worse case, as opposed to the label being completely hidden (i.e., facing back into the product-display structure).

Still referring to FIG. 2, alternate embodiments of the electronic system 20 are contemplated. For example, the system 20 may include components that are not shown in, or described in conjunction with, FIG. 2. Furthermore, the system 20 can include more than one image-capture apparatus 26, one apparatus for each group of one or more product-display structures 24. Moreover, the image-collection circuit 28 can be configured for direct upload of captured images (all captured images or only the selected captured images) to the database 32. In addition, although described as being separate from the electronic system 20, the electronic client rendering device 34 can be a component of, or otherwise can be part of, the electronic system. Furthermore, any embodiments described in conjunction with FIGS. 1 and 3-22 may be applicable to the system 20 of FIG. 2.

Figure 3:
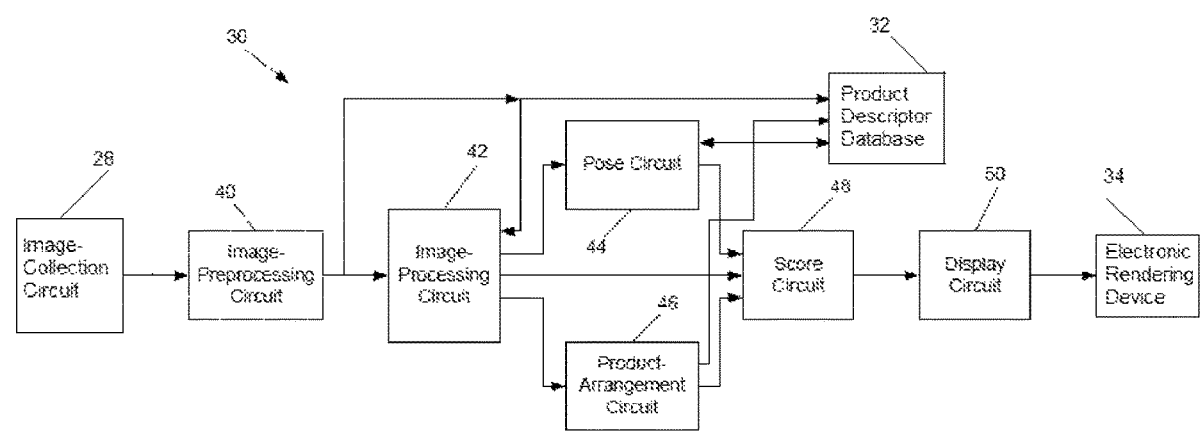
FIG. 3 is a diagram of a portion of the electronic processing system of FIG. 2, according to an embodiment.

FIG. 3 is a diagram of the electronic processing system 30 of FIG. 2, according to an embodiment.

The electronic processing system 30 includes an optional image-preprocessing circuit 40, an image-processing circuit 42, a pose circuit 44, a product-arrangement circuit 46, a score circuit 48, and a display circuit 50. These circuits can be stand-alone circuits, can be part of another circuit such as a microprocessor, microcontroller, FPGA, or application-specific integrated circuit (ASIC), or can represent respective functions that a circuit, such as a microprocessor, microcontroller, or FPGA, is configured to perform.

The optional image-preprocessing circuit 40 is included in the electronic processing system 30 if the image-collection circuit 28 (FIG. 2) is not configured to select captured images for further processing as described above in conjunction with FIG. 2. The image-preprocessing circuit 40 can have a structure and operational configuration that are similar to the structure and operational configuration described above for the image-collection circuit 28 in conjunction with FIG. 2.

The image-processing circuit 42 is configured to receive the selected ones of the captured images from the image-collection circuit 28 (FIG. 2) or from the image-preprocessing circuit 40, to identify each product 22 (FIG. 2) in at least one of the selected capture images, to identify empty locations (e.g., slots, columns) that are void of product, and to identify locations in which unidentified products are located. The image-processing circuit 42 also can be configured to control the orientation and functioning of the image-capture apparatus 26 (FIG. 2), for example, as described above in conjunction with FIG. 2. The operation of the image-processing circuit 42 is further described below in conjunction with FIGS. 4-8.

The pose circuit 44 is configured to determine a respective pose of each of the products 22 (FIG. 2) identified by the image-processing circuit 42, and to compare the respective pose to a respective canonical pose of the product. As described above, a product's canonical pose can be the pose in which the product's label is fully facing outward from the product-display structure 24 (FIG. 2), or can be any other pose that the product company's product-display guidelines indicate. For example, the pose circuit 44 can be configured to determine how much (e.g., in degrees or radians) a product 22 is rotated in the plane of the image relative to its canonical pose, or how much a product is rotated about an axis parallel to the image relative to its canonical pose such that the product label is skewed, i.e., is facing toward one side or the other side of the product-display structure 24, or is hidden (i.e., facing backwards into the product-display structure such that no portion of the product label is visible from the front of the product-display structure.) Operation of the pose circuit 44 is further described below in conjunction with FIGS. 9-15.

The product-arrangement circuit 46 is configured to determine, in real time, an arrangement, i.e., a realogram, within the product-display structure 24 (FIG. 2), of the products 22 (FIG. 2) identified by the image-processing circuit 42, to detect, in real time, one or more errors in the product realogram, and to determine, in real time, corrections for such errors. For example, the product-arrangement circuit 46 can be configured to perform these functions by implementing one or more planogram algorithms, examples of which are described below in conjunction with FIG. 17. Further to this example, the product-arrangement circuit 46 can be configured to detect an error in the determined product realogram by comparing the determined product realogram with a product-arrangement planogram constructed according to product-arrangement guidelines. Such an error can include identified products 22 being disposed in incorrect locations of the product-display structure 24, empty product locations within the product-display structure, and unidentified products being disposed in the product-display structure. And a correction to such an error can include indicating what product 22 needs to be restocked in which empty location within the product-display structure 24, what products need to swap locations within the product-display structure, and what products (i.e., unidentified products) need to be removed from the product-display structure.

The score circuit 48 is configured to rate, in real time, a compliance of the presentation of the products 22 (FIG. 2) within the product-display structure 24 (FIG. 2) with a product provider's product-display guidelines, to generate, in real time, one or more scores indicative of the rating, and to provide, in real time, the one or more scores to the display circuit 50. For example, an overall product-display score may range from 0 to 100, with a score of 100 indicating full, or perfect, compliance, and a score of 0 indicating a complete lack of compliance. The score circuit 48 is configured to generate the one or more scores in response to the actual product poses as determined by the pose circuit 44 and the actual product arrangement (i.e., the realogram) as determined by the product-arrangement circuit 46. More specifically, the score circuit 48 is configured to generate a product-pose score in response to the differences between the actual product poses and the respective canonical poses as determined by the pose circuit 44, and is configured to generate a product-arrangement score in response to a difference between a product-arrangement template (i.e., a planogram) and the actual product realogram as determined by the product-arrangement circuit 46. The score circuit 48 also can be configured to generate a stocked-product-display score in response to empty product-display locations detected by the image-processing circuit 42. The score circuit 48 can be further configured to generate additional information including charts of rating scores over a number of vendors and venues, a history of rating scores for a particular vendor or venue, one or more images or reproductions of the scored product display, a list of products 22 (FIG. 2) missing from the product-display structure 24 (FIG. 2) and the locations in the product-display structure where the missing products should be, indications of damaged products and products (identified or unidentified) that should not be in the product-display structure, and an indication of which products are improperly posed.

And the display circuit 50 is configured to convert, in real time, the scores and other information from the score circuit 48 into an electronic format that is suitable for an electronic device, such as the client rendering device 34 (FIG. 2), to receive and to convert into a human-consumable display (e.g., a visual display such as a dashboard).

Still referring to FIG. 3, alternate embodiments of the electronic processing system 30 are contemplated. For example, the processing system 30 may include components that are not shown in, or described in conjunction with, FIG. 3. Furthermore, any function described as being performed by one of the circuits of the processing system 30 may be performed by another of the circuits. Moreover, any embodiments described in conjunction with FIGS. 1-2 and 4-22 may be applicable to the processing system 30 of FIG. 3.

Figure 4:
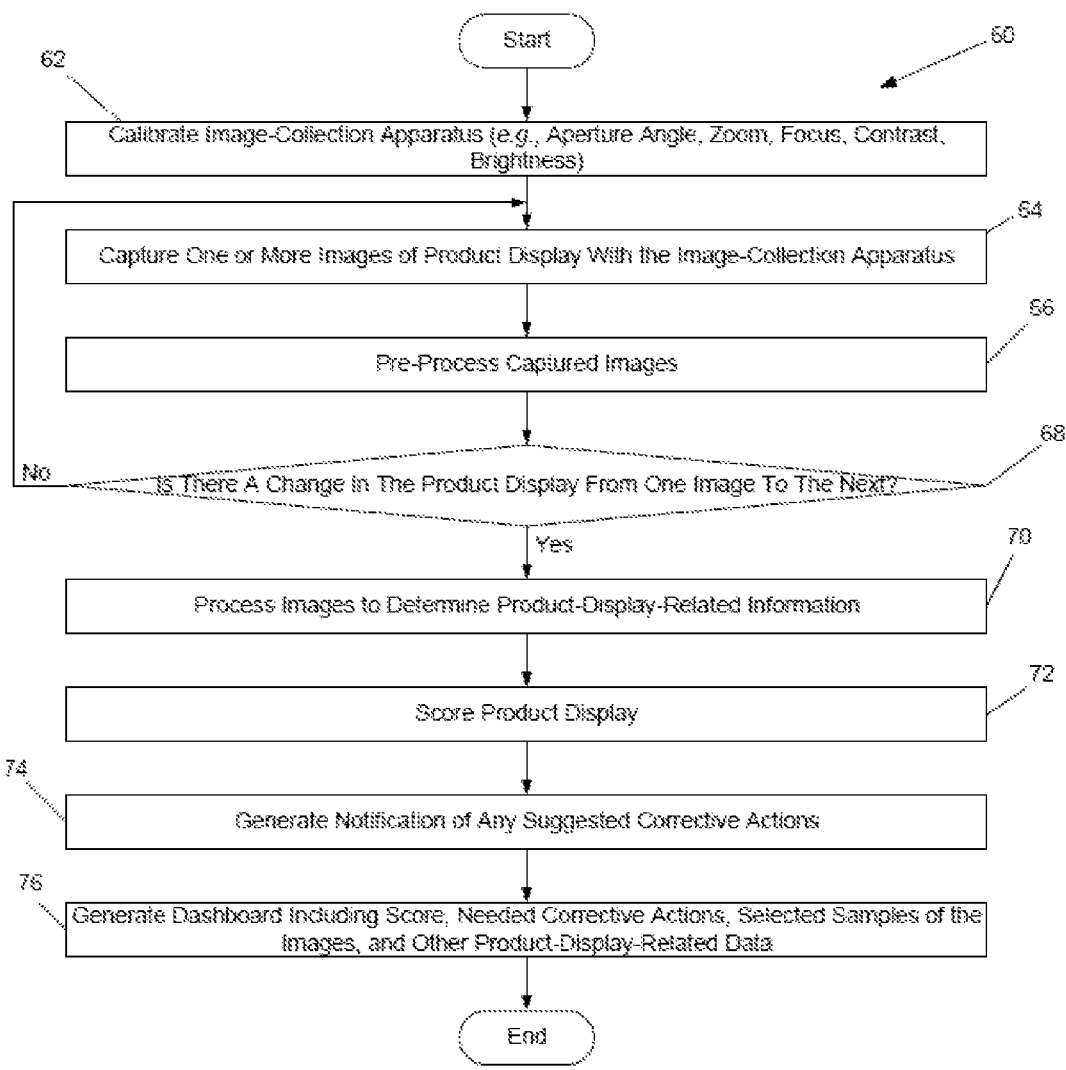
FIG. 4 is a flow diagram of the operation of the electronic processing system of FIGS. 2-3, according to an embodiment.

FIG. 4 is a flow diagram 60 of the operation of the electronic system 20 of FIGS. 2-3, according to an embodiment.

Referring to FIGS. 2-4, at a step 62 of the flow diagram 60, the image-collection circuit 28, the image-preprocessing circuit 40, or the image-processing circuit 42, calibrates the image-capture apparatus 26. For example, where the image-capture apparatus 26 is a still or video camera, the circuit 28, 40, or 42 may control one or more motors to adjust the position and angle of the camera's aperture 38, and may adjust one or more of, e.g., the zoom, focus, f-stop, contrast, brightness, color temperature, and color balance of the camera. Ideally, the angle of the aperture 38 relative to the product-display structure 24 is such that a focal plane of the camera is approximately parallel to a plane in which the front of the product-display structure 24 approximately lies. Further in example, the circuit 28, 40, or 42 may adjust camera zoom, position, f-stop, and focus by directing the aperture 38 of the camera to a calibration object of a size, shape (e.g., rectangular), and distance that is "known" to the circuit 28, 40, or 42, and by adjusting, in a conventional manner, the zoom, position, and focus so that the in-focus calibration object fills a predetermined calibration region of the captured image.

Next, at a step 64 of the flow diagram 60, the image-capture apparatus 26 captures one or more images of the products 22 in the product-display structure 24. For example, the image-capture apparatus 26 generates a video stream of captured images.

Then, at a step 66 of the flow diagram 60, the image-collection circuit 28, the image-preprocessing circuit 40, or the image-processing circuit 42 preprocesses the captured images in a conventional manner. For example, the circuit 28, 40, or 42 conventionally discards, or otherwise casts aside, captured images in which the view of the products 22 is obstructed by, e.g., a consumer or stock person standing in front of the product-display structure 24. The circuit 28, 40, or 42 also can store, in the database 32, the cast-aside images.

Next, at a step 68 of the flow diagram 60, the image-collection circuit 28, the image-preprocessing circuit 40, or the image-processing circuit 42 determines, in a conventional manner, whether at least two of the remaining (non-cast-aside) captured images show a change in the display of products 22 from the earlier image to the later image. If the circuit 28, 40, or 42 detects no change in the display of products 22, then the circuit 28, 40, or 42 returns to the step 64 and continues to preprocess images that the image-capture apparatus 26 captures. If no change is detected in the display of products 22 from one captured image to a subsequent captured image, then a previous analysis and score of the presentation of products in the product-display structure 24 is still valid, and a new analysis and scoring is unnecessary. But if the circuit 28, 40, or 42 detects a change in the display of products 22, then the circuit 28, 40, or 42 selects the image that includes the detected change in the display of products 22, and proceeds to a step 70.

At the step 70 of the flow diagram 60, the image-processing circuit 42 analyzes the selected captured image, identifies the products 22 in the product-display structure 24, and identifies any empty product locations. The image-processing circuit 42 also can determine whether a product 22, or a label of the product, is damaged. Alternatively, if only a portion of the selected captured image shows a change in the products 22, then the image-processing circuit 42 can analyze only that portion of the image, and can determine that the products in the remainder (i.e., in the unchanged portion) of the image are unchanged. How the image-processing circuit 42 performs this analysis is described below in conjunction with FIGS. 5-8.

Still at the step 70, the pose circuit 44 determines the actual poses of the products 22 identified by the image-processing circuit 42, compares the actual poses to the respective canonical poses of the products stored in the database 32, and determines a respective difference between the actual pose and a canonical pose for each identified product. How the pose circuit 44 performs this determination is described below in conjunction with FIGS. 9-12. Furthermore, the pose circuit 44, instead of the image-processing circuit 42, can determine whether a product 22, or a label of the product, is damaged.

Still at the step 70, the product-arrangement circuit 46 determines the actual arrangement (i.e., the realogram) of the products 22 identified by the image-processing circuit 42, compares the realogram to one or arrangement templates (i.e., planograms) stored in the database 32, determines whether there are any errors in the realogram, and, optionally, identifies the discovered error(s) and a correction therefor. How the product-arrangement circuit 46 performs this analysis is described below in conjunction with FIG. 17.

Next, at a step 72 of the flow diagram 60, the score circuit 48 scores, in a conventional manner, the presentation of the products 22 in response to information from the image-processing circuit 42, the pose circuit 44, and the product-arrangement circuit 46. For example, the score circuit 48 generates an overall score that depends on whether the correct products 22 are in the product-display structure 24, whether there is any damage to any of the products, whether there are any empty product locations, the differences between the actual poses and the canonical poses of the products, and the arrangement of the products. The score circuit 48 also can generate a respective score for each of these criteria. For example, the score circuit 48 can generate a correct-product score, a product-damage score, an empty-location score, a pose score, and a product-arrangement (realogram) score.

Then, at a step 74 of the flow diagram 60, the score circuit 48 generates, in a conventional manner, one or more notifications of suggested corrective actions. For example, the score circuit 48 can identify which, if any, products 22, should be removed from the product-display structure 24 because they do not belong there or are damaged, should be reposed, or should be moved to another location within the product-display structure. Further in example, the score circuit 48 can indicate, for any empty location of the product-display structure 24, which product with which to restock the empty location.

Next, at a step 76 of the flow diagram 60, the display circuit 50 generates, in a conventional manner, the electronically displayable dashboard 36, which includes the information generated, or otherwise provided, by the score circuit 48. For example, such information includes product-related scores, errors, corrective actions, one or more of the selected captured images, representations of the products, representations of the display of products, graphs, and charts (e.g., showing scoring history for a vendor or venue, showing score comparison between vendors and between venues). A version of the dashboard 36 is described below in conjunction with FIG. 18.

Further at the step 76, the display circuit 50 provides the electronically displayable dashboard 36 to one or more of the client devices 34 for rendering, in real time, the dashboard to, e.g., one or more field agents, or provides the electronically displayable dashboard to the database 32 for storage and later retrieval by one or more client devices.

Still referring to FIG. 4, alternate embodiments of the procedure described by the flow diagram 60 are contemplated. For example, the procedure may include steps that are not shown in, or described in conjunction with, the flow diagram 60, and some of the described steps may be omitted or combined with other steps. Furthermore, the steps may be performed in an order different from the order described. Moreover, any embodiments described in conjunction with FIGS. 1-3 and 5-22 may be applicable to the procedure described in conjunction with the flow diagram 60 of FIG. 4.

Figure 5:
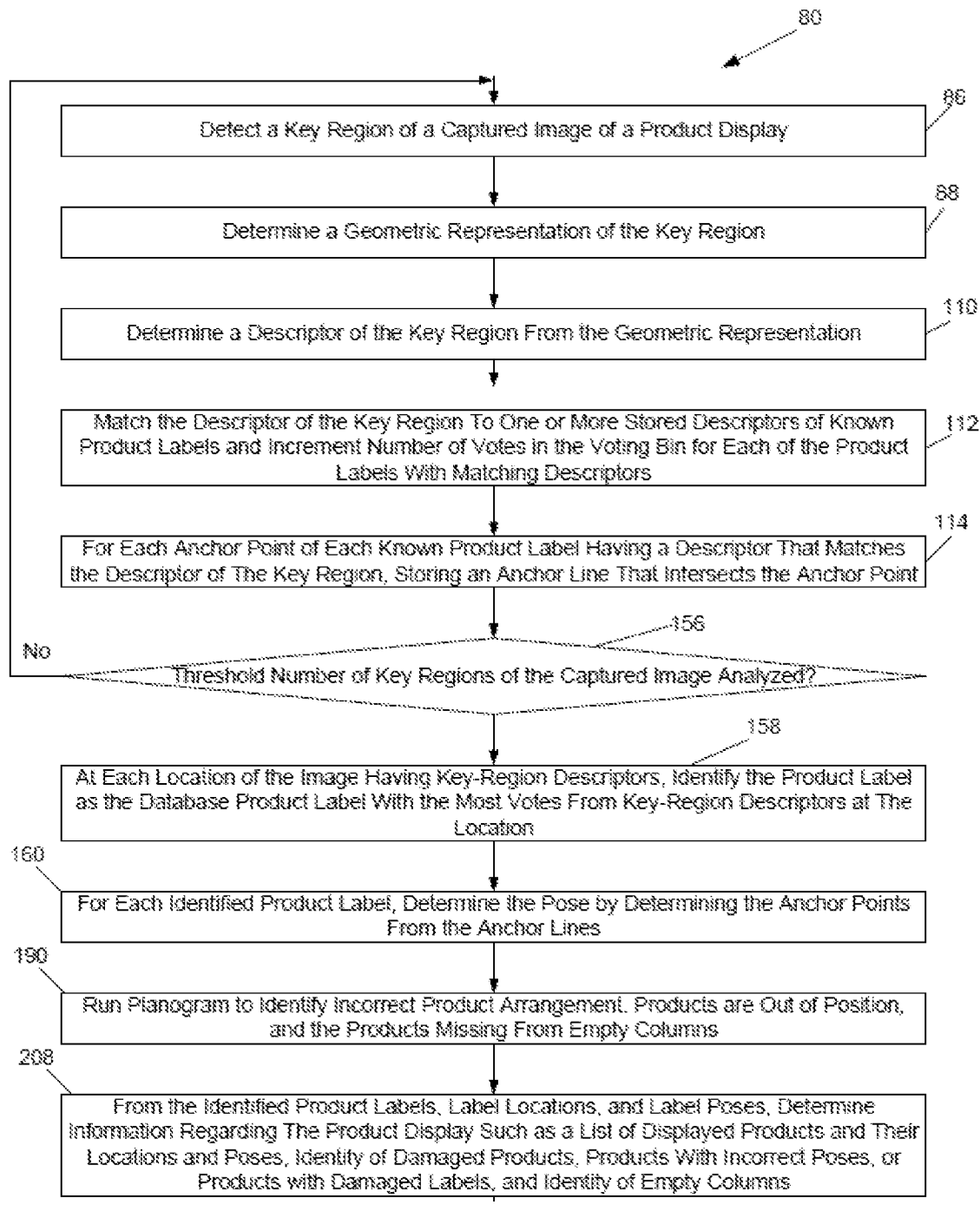
FIG. 5 is a flow diagram of a step of the flow diagram of FIG. 4, according to an embodiment.

FIG. 5 is a flow diagram 80 of a procedure for performing the step 70 of the flow diagram 60 of FIG. 4, according to an embodiment. The flow diagram 80, in conjunction with FIGS. 6-16, describes how the image-processing circuit 42 of FIG. 3 implements a uniquely modified Speeded-Up-Robust-Features (SURF) algorithm to identify products 22 (FIG. 1), empty product locations, and unidentified products, and how the pose circuit 44 of FIG. 3 implements a unique pose algorithm to determine the respective poses of the identified products. The following description is intended to convey the operation of the algorithms to those who are not experts in the field of image processing. It is, therefore, to be understood that these algorithms are mathematically complex, and that the elements of the following description do not necessarily correspond to the mathematical elements of the algorithms on a one-to-one basis. A rigorous mathematical description of the algorithms is presented in E. Yoruk, T. O. Kahn, and C. Akgul, *An Efficient Hough Transform for Multi-Instance Object Recognition and Pose Estimation*, 1352-1357, 10.1109/ICPR.2016.7899725, which is included herein as Appendix A. Furthermore, a rigorous mathematical description of the conventional SURF algorithm is presented in H. Bay, T. Tuytelaars, and L. Van Gool, *SURF: Speeded Up Robust Features,* In: A. Leonardis, H. Bischof, and A. Pinz (eds) Computer Vision—EECV 2006, Lecture Notes in Compuer Science, vol. 2951, Springer, Berlin, Heidelberg (ISBN 978-3-540-33833-8), which is incorporated herein by reference.

Operation of the image-processing circuit 42 and the pose circuit 44 of FIG. 3, while these circuits perform the step 70 of the flow diagram 60 of FIG. 4, is now described in conjunction with FIGS. 2-16, according to an embodiment.

FIG. 6 is a diagram of a geometric abstraction of a key region 82 around a key point (x,y) of a portion of a captured image that the image-processing circuit 42 selects, according to an embodiment. Although shown as being a square, the key region 82 can have any other suitable shape FIG. 7 is a diagram of the key region 82 of the portion of the captured image of FIG. 6, and demonstrates how unidirectional scaling and shearing can be applied in a dimension parallel to an edge line 84 of the key region without affecting the geometric properties (e.g., scale, location, orientation) of the key region, according to an embodiment.

FIG. 8 is an example of a captured image that has undergone different transformations parallel to edge lines of respective key regions of the image, according to an embodiment.

Referring to FIGS. 5-6, at a step 86 of the flow diagram 80, the image-processing circuit 42 detects a key region 82 of an image that was captured by the image-capture apparatus 26 (FIG. 2) and that was selected by the image-collection circuit 28 (FIG. 2), the image-preprocessing circuit 40, or the image-processing circuit 42. The key region 82 is a high-contrast region or "blob" having at least one edge across which there is a significant change in luminance (e.g., a change in luminance of at least 30% from one side of an edge to another side of the edge) from bright to dark or from dark to bright. An example of the key region 82 is a white spot on a black background, or a black spot on a white background. For example, the image-processing circuit 42 can detect the key region 82 using a conventional key-region-detection portion of the SURF algorithm described in the above-referenced paper by H. Bay et al.

Next, at a step 88 of the flow diagram 80, the image-processing circuit 42 determines a geometric representation (e.g., the approximate two-dimensional shape) of the detected key region 82 as described below.

Referring to FIGS. 5-6, still at the step 88, the image-processing circuit 42 determines a key point, with coordinates (x,y), within the detected key region 82. For example, the image-processing circuit 42 implements a corresponding portion of the SURF algorithm described in the above-incorporated paper by H. Bay et al. For example, the corresponding portion of the SURF algorithm determines the key point (x,y) of the key region 82 as one of the peak locations of the determinant of the Hessian map of the captured image. In fact, the image-processing circuit 42 can detect the key region 82 by first detecting the key point (x,y).

Then, still at the step 88, the image-processing circuit 42 determines a scale S and an orientation angle θ of the key region 82 using, for example, a corresponding portion of the SURF algorithm described in the above-incorporated paper by H. Bay et al. For example, the image-processing circuit 42 effectively identifies radii emanating from the key point (x,y) of the key region 82, determines the respective contrast change along each of these radii, determines which one of these radii demonstrates the largest contrast change, determines the length of the radius demonstrating the largest contrast change (this radius can be called the dominant radius), and sets the scale S equal to the determined length of the dominant radius. The image-processing circuit 42 also determines the angle θ, which gives the orientation of the dominant radius (the radius 96 in FIG. 6). For example, as shown in FIG. 6, the angle θ is measured from a horizontal axis 100 of the frame of reference in which the key region 82 effectively lies. The key region 82 has sides with centers 92, which are tangent to a circle 94 having a radius of length S from the key point (x,y).

Next, still at the step 88, the image-processing circuit 42 effectively defines an edge line L 84 as the line that is tangent to the circle 94 at the point where the dominant radius 96 intersects the circle.

Then, still at the step 88, the image-processing circuit 42 effectively aligns the key region 82 such that a side 98 of the square key region is co-linear with the edge line L 84.

Next, still at the step 88, the image-processing circuit 42 can define an angle α that the edge line L 84 makes with the line 100 such that θ=90°−α.

Then, still at the step 88, the image-processing circuit 42 changes the definition of the key region 82 from the parameters (x,y), S, θ to (x,y,L), where "L" represents the equation, in the form y=mx+b, that defines the edge line L 84. Given the location $(x_{key}, y_{key})$, the scale $s_{key}$, and the orientation $θ_{key}$ for the key region 82, the edge line L 84 is given by the following equation:

$$(x-x_{key})\cos θ_{key}+(y-y_{key})\sin θ_{key}=S_{key}$$

And rewriting this equation in the form y=mx+b yields the following equation:

$$y = -\frac{\cos θ_{key}}{\sin θ_{key}} \cdot x + \frac{S_{key} + x_{key} \cos θ_{key} + y_{key} \sin θ_{key}}{\sin θ_{key}}$$

Referring to FIGS. 6-7, the (x,y,L) definition of the key region 82 remains valid even if a portion of selected captured image in which the key region is located later undergoes one or more of a unidirectional scaling in a dimension parallel to the edge line L 84, and shearing in a dimension parallel to the edge line L. Said another way, a feature of the (x,y,L) definition of a key region 82 is that if the captured image undergoes one or more of unidirectional scaling in a dimension parallel to the edge line L 84, and shearing in a direction parallel to the edge line L, then the edge line L does not change relative to the key point (x,y); consequently, even if the image undergoes such a transformation, (x,y,L) still defines the key region. FIG. 8 shows an example of an image that has undergone unidirectional scaling and shearing in dimensions parallel to the edge lines of three key regions 102, 104, and 106, and shows that the respective (x,y,L) definition of each key region remains valid even in the respective version of the image that has undergone such a transformation.

Referring to FIGS. 5-7, at a step 110 of the flow diagram 80, the image-processing circuit 42 calculates a descriptor vector $\vec{d}_{cap} = (d_{cap1}, d_{cap2}, d_{cap3}, \ldots d_{capn})$ for the key region 82 of the captured image using the luminance values of the pixels within the square key region. For example, the image-processing circuit 42 may perform this calculation by implementing a corresponding portion of the SURF algorithm described in the above-incorporated paper by H. Bay et al. In an embodiment, n=64 such that $\vec{d}_{cap}$ is a 1×64 vector for which the image-processing circuit 42 derives the values of the vector elements based on histograms of gradients at pixels that lie within the key region 82.

Referring to FIGS. 3 and 5, at a step 112 of the flow diagram 80, the image-processing circuit 42 compares the descriptor $\vec{d}_{cap}$ of the captured image to descriptors $\vec{d}_{ref}$ of multiple reference images stored in the database 32, where each reference image is of a respective product 22 (FIG. 2) in a canonical pose. Each descriptor $\vec{d}_{ref}$ of a reference image has the general form $\vec{d}_{ref} = (d_{ref1}, d_{ref2}, d_{ref3}, \ldots, d_{refn})$, and the image-processing circuit 42 compares the descriptor $\vec{d}_{cap}$ to each descriptor $\vec{d}_{ref}$ by calculating, for each descriptor $\vec{d}_{ref}$, a descriptor difference (i.e., the sum of the squared descriptor-element differences) given by the equation $|\vec{d}_{cap} - \vec{d}_{ref}|^2 = (d_{cap1} - d_{ref1})^2 + (d_{cap2} - d_{ref2})^2 + \ldots + (d_{capn} - d_{refn})^2$.

Next, still at the step 112, the image-processing circuit 42 identifies the descriptor difference having the smallest magnitude, relates the descriptor $\vec{d}_{cap}$ and the descriptor $\vec{d}_{ref}$ yielding the smallest descriptor difference as matching descriptors, and effectively adds a vote to a bin for the product represented by the reference image to which the matching descriptor $\vec{d}_{ref}$ belongs. For example, if the reference image to which the matching descriptor $\vec{d}_{ref}$ belongs is of a one-liter bottle of Coca-Cola Light®, then the image-processing circuit 42 adds a vote to the bin corresponding to the one-liter bottle of Coca-Cola Light® to indicate that, at least according to this one descriptor difference, the portion of the captured image corresponding to the descriptor $\vec{d}_{cap}$ is likely of a one-liter bottle of Coca-Cola Light®. If two or more descriptor differences yield approximately the same smallest value, then the image-processing circuit 42 adds one vote to each of the bins for the products represented by the reference images to which the matching descriptors $\vec{d}_{ref}$ respectively belong. Furthermore, because the total number of reference descriptors $\vec{d}_{ref}$ for all reference images in the database 32 could be in the tens or hundreds of thousands, instead of determining the descriptor differences for all of the reference descriptors $\vec{d}_{ref}$ in the database in a "brute-force" manner, the image-processing circuit 42 can implement a reduced-complexity approach to find the smallest descriptor difference(s) for each captured-image descriptor $\vec{d}_{cap}$. An example of such a reduced-complexity approach is a kd-tree approach. Because such a kd-tree approach is known, it is not described in detail herein.

Next, referring to FIGS. 3, 5, and 9-12, at a step 114 of the flow diagram 80, the pose circuit 44 determines an anchor line for each anchor point of a reference image having a reference descriptor $\vec{d}_{ref}$ that matches the captured-image descriptor $\vec{d}_{cap}$ of the captured image.

FIG. 9 is a diagram of a reference image 116 of a product 22 having a rectangular label 118, and of a square key region 120 having an edge line 122 and a reference descriptor $\vec{d}_{ref}$ that matches the captured-image descriptor $\vec{d}_{cap}$. The key region 120 was previously generated from a corresponding key region of the reference image 116 to calculate a descriptor as described above in conjunction with FIGS. 5-7.

To define the rectangular shape of the label 118, at least three anchor points 124, 126, and 128 are defined for the label, because at least three anchor points are needed to unambiguously define a rectangle in two-dimensional space. The image-processing circuit 42 can define the anchor points 124, 126, and 128, or another computing circuit can define the anchor points at around the time that the reference image is stored in the database 32 (FIG. 2). And although shown as being at respective corners of the label 118, the anchor points 124, 126, and 128 can be located elsewhere within the reference image 116.

FIG. 10 is a diagram of a portion 130 of a captured image 132, the image portion being of a product 22 (FIG. 2) in the product-display structure 24 (FIG. 2), and of a square key region 134 having an edge line 136 and having a captured-image descriptor $\vec{d}_{cap}$ that matches the reference-image descriptor $\vec{d}_{ref}$ of FIG. 9. The image-processing circuit 42 (FIG. 3) previously generated the key region 134 from a key region 82 (FIGS. 6-7) of the captured-image portion 130 as described above in conjunction with FIGS. 5-7. As compared to the reference image 116 of FIG. 9, the captured-image portion 130 has effectively undergone a similarity transformation (the captured-image portion is, effectively, a scaled-down version of the reference image), and shearing in a dimension parallel to the edge line 136 of the key region 134.

FIG. 11 is a diagram of the reference image 116 overlaying the portion 130 of the captured image 132, and of determined anchor lines 140, 142, and 144 respectively corresponding to the anchor points 124, 126, and 128 of the reference image, according to an embodiment in which the reference image 116 is effectively scaled down (i.e., has undergone a similarity transform) to the same scale as the portion 130 of the captured image 132.

FIG. 12 is a diagram of a grid region 152 of the portion 130 of the captured image 132 in which anchor lines corresponding to the anchor point 124 intersect, according to an embodiment.

Referring to FIGS. 3, 5, and 9-12, at the step 114 of the flow diagram 80, the pose circuit 44 performs a similarity transform on the reference key region 120 of the reference image 116 to align the key region 120 with, and, effectively, to lay the key region 120 over, the captured key region 134 of the portion 130 of the captured image 132. First, the pose circuit 44 translates the reference key region 120, so that the key point, ($x_{ref}$, $y_{ref}$), of the reference key region is aligned with, and effectively overlays, the key point, ($x_{cap}$, $y_{cap}$), of the captured key region 134. Next, the pose circuit 44 rotates the reference key region 120 in the image plane (the plane of FIGS. 9-11), and scales, in isotropic fashion, the reference key region so that the reference key region of the reference image 116 approximately overlays the captured key region 134 of the captured-image portion 130, and so that the edge line 122 of the reference key region 120 is aligned with, and effectively overlays, the edge line 136 of the captured key region 134. For example, because the reference image 116 typically is larger than the captured-image portion 130, the reference key region 120 is typically larger than the captured key region 134; therefore, the pose circuit 44 reduces the size of the reference key region 120 in an isotropic manner to the size of the captured key region 134.

Next, still at the step 114, the image-processing circuit 42 applies the above-described similarity transformation, which the image-processing circuit used to align the reference key region 120 onto the captured key region 134, to the anchor points 124, 126, and 128 of the reference image 116.

The result of the above-described translate, scale, and align procedure of step 114 is shown in FIG. 11.

Referring to FIGS. 2-3, 5, and 10-11, although the corner points 146, 148, and 150 of the captured-image portion 130 do not overlay the similarity-transformed anchor points 124, 126, and 128, respectively, of the reference image 116, because, as described above, the shearing of the captured-image portion 130 is parallel to the edge line 136 of the key region 134, it can be shown, mathematically, that the each corner point lies on an anchor line that intersects a respective anchor point of the reference image and that is parallel to the edge lines 122 and 136. For example, it can be shown, mathematically, that the corner point 146 lies on an anchor line 140 that intersects the anchor point 124 and that is parallel to the edge lines 122 and 136. Similarly, it can be shown, mathematically, that the corner point 148 lies on an anchor line 142 that intersects the anchor point 126 and that is parallel to the edge lines 122 and 136, and that the corner point 150 lies on an anchor line 144 that intersects the anchor point 128 and that is parallel to the edge lines 122 and 136. Said another way, after the reference and captured key regions 120 and 134 are aligned by similarity transforming the reference key region 120, the complete alignment of the remaining regions of the reference image 116 and captured image 132 can occur only if the reference image is further sheared or scaled parallel to the edge line 136 of the captured key region 134 from which $\vec{d}_{cap}$ was computed. Because only then can the already-achieved alignment of the reference and capture key regions 120 and 134 be maintained. Such a further shearing/scaling would move, effectively, the anchor points 124, 126, and 128 of the reference image 116 along the anchor lines 140, 142, and 144 toward, and to, the corner points 146, 148, and 150, respectively.

Referring to FIGS. 10-12, because of noise and other artifacts in the captured image 132, anchor lines through the anchor points 124, 126, and 128 may not intersect the corresponding corners 146, 148, and 150 of the portion 130 of the captured image 132 as shown in FIG. 11. As an example of such an artifact, shear or unidirectional scaling in the captured-image portion 130 may not be precisely in a dimension parallel to the edge line 136 of the key region 134.

Consequently, referring to FIGS. 1-2, 5, and 12, still at the step 114, the pose circuit 44 divides the captured-image portion 130 into respective grid regions 152 (only one grid region 152 shown in FIG. 12), and determines which respective grid region each of the anchor lines 140, 142, and 144 intersects. For example, the grid regions 152 may be a priori set by the pose circuit 44 based on the distance D of the aperture 38 to the product-display structure. Further in example, the captured-image portion 130 may be divided into nine grid regions 152.

Referring to FIGS. 2, 5, and 11-12, still at the step 114, the pose circuit 44 identifies each possible group of three grid regions 152, and adds a vote to the group or groups in which each grid region is intersected by at least one of the anchor lines 140, 142, and 144. For the example shown in FIG. 11, the pose circuit 44 adds a vote to the group of grid regions 152 respectively including the corner points 146, 148, and 150 of the image portion 130 (the pose circuit may add a vote to one or more other groups of grid regions in which each grid region is intersected by at least one of the anchor lines 140, 142, and 144).

Referring to FIGS. 2-3 and 5-12, in summary of the steps 86, 88, 110, 112, and 114, of the flow diagram 80, the image-processing circuitry 42 and pose circuit 44 perform the following functions. The image-processing circuitry 42 detects and defines a key region 134 of a portion 130 of a captured image 132, calculates a descriptor $\vec{d}_{cap}$ for the key region 134, identifies matching descriptors $\vec{d}_{ref}$ (if any) of reference images 116 stored in the database 32, and adds a vote to the bin of each reference image that includes a matching descriptor $\vec{d}_{ref}$. And the pose circuit 44 transforms, as needed, each reference image 116 including a matching descriptor $\vec{d}_{ref}$, lays the key region 120 of each such reference image over the key region 134 of the portion 130 of the captured image 132, determines the anchor lines 140, 142, and 144, and adds a vote to the bin for each group of three grid regions 152 for which each of the grid regions is intersected by at least one of the anchor lines.

Referring to FIGS. 2-3 and 5-12, at a step 156 of the flow diagram 80, the image-processing circuit 42 determines whether the image-processing circuit and the pose circuit 42 have detected and analyzed at least a threshold number of key regions of the captured image 132. The threshold number is a number of key regions suitable to insure, at least statistically, that the image-processing circuit 42 can identify all of the products 22 and empty product locations in the product-display structure 24, and that the pose circuit 44 can determine the poses of all of the identified products. For example, the threshold number of key regions may be in an approximate range of 300-1000.

Referring to FIGS. 2-3 and 5-12, if, at the step 156, the image-processing circuit 42 determines that image-processing circuit and the pose circuit 44 have not detected and analyzed at least the threshold number of key regions of the captured image 132, then the image-processing circuit returns to the step 86.

But if, at the step 156, the image-processing circuit 42 determines that the image-processing circuit and the pose circuit 44 have detected and analyzed at least the threshold number of key regions of the captured image 132, then the image-processing circuit proceeds to a step 158.

Referring to FIGS. 2-3, 5, and 9-10, at the step 158 of the flow diagram 80, for each portion 130 of the captured image 132, the image-processing circuit 42 identifies the product 22 occupying the portion as the product corresponding to the reference image 116 having the most matching-descriptor votes per the step 112 of the flow diagram 80.

Still at the step 158, if the image-processing circuit 42 has generated a number of different descriptors $\vec{d}_{cap}$ for a portion 130 of the captured image 132, but these descriptors have few, if any, matching descriptors $\vec{d}_{ref}$ then the image-processing circuit identifies the captured-image portion 130 as including an unidentified product. Alternatively, if the image-processing circuit 42 fails to detect a product 22 in the captured-image portion 130, then the image-processing circuit can indicate that no detection of any kind has been made for the captured-image portion. Such a lack of detection typically corresponds to an empty location, or a location that includes a product that the image-processing circuit 42 cannot detect because the database 32 (FIG. 2) stores no reference image of the product.

But if, at the step 158, the image-processing circuit 42 has generated a number of similar/same descriptors $\vec{d}_{cap}$ for a portion 130 of the captured image 132, or has generated few or no descriptors $\vec{d}_{cap}$ for the image portion 130, then the image-processing circuit identifies the captured-image portion 130 as including an empty location of the product-display structure 24. Generating a number of similar/same descriptors, or few/no descriptors, indicates an image portion having a uniform luminance, such as one would expect from an empty location of a product-display structure.

Then, at a step 160 of the flow diagram 80, the pose circuit 44 determines the pose of each product 22 identified by the image-processing circuit 42. First, the pose circuit 44 determines which group of three grid regions 152 (FIG. 12) has the most anchor-line votes, and identifies each of the three anchor points of the identified product as being within a respective one of these regions. Then, from the identified anchor points, the pose circuit 44 constructs a parallelogram in a conventional manner Next, the pose circuit 44 compares the parallelogram to a rectangle (or to any other known shape of the identified product 22 or product label) in a conventional manner, and determines the pose of the product in response to the comparison in a conventional manner For example, the pose circuit 44 can determine how may degrees the product 22 is rotated to the left or right on a shelf, or in the image plane, relative to the canonical pose for the product. Or, the pose circuit 44 can determine whether the difference between the determined pose and the canonical pose is within, or exceeds, a threshold error.

FIGS. 13-16 illustrate the operation of the image-processing circuit 42 and the pose circuit 44, as described above in conjunction with steps 86, 88, 110, 112, 114, 156, 158, and 160 of the flow diagram 80, for a captured image of an actual product, according to an embodiment.

FIG. 13 includes a captured image 170 of an actual product 172, a reference image 174 of the actual product in its canonical pose and having anchor points 176, 178, and 180, and lines 182 connecting matching pairs of descriptors $\vec{d}_{cap}$ and $\vec{d}_{ref}$ of the captured and reference images, respectively, according to an embodiment.

FIG. 14 includes the captured image 170 of the actual product 172, grid regions 184, and the three grid regions $184_a$, $184_b$, and $184_c$ of the group of grid regions having the greatest number of votes, i.e., the greatest number of intersecting anchor lines. The three grid regions 184a, 184b, and 184c include the corners of the actual product 172 that coincide with the anchor points 176, 178, and 180 of FIG. 13.

FIG. 15 is a template of a rectangle 186 defined by the anchor points 176, 178, and 180 of FIG. 13, according to an embodiment.

FIG. 16 includes a parallelogram 188 laid over the actual product 172 in the captured image 170, according to an embodiment. The parallelogram 188 is defined by anchor points 190, 192, and 194, which correspond to the grid regions 184a, 184b, and 184c of FIG. 14. By comparing the shape of the parallelogram 188 to the shape of the rectangle 186, the pose circuit 44 can determine the pose of the actual product 172, for example, relative to the canonical pose represented by the rectangle 186.

Referring to FIGS. 2-3, 5, and 17, at a step 190 of the flow diagram 80, the product-arrangement circuit 46 determines the actual arrangement, i.e., the realogram, of the identified products 22 in the product-display structure 24, and determines which, if any, products are out of position and which products are missing from any identified empty columns, according to an embodiment. The product-arrangement circuit 46 makes these determination in response to information from the image-processing circuit 42, such information including the identities and locations of the products 22, and the locations of unidentified products and empty product columns. Alternatively, the locations of unidentified products and empty locations can be combined into a single category of the locations for which the image-processing circuit 42 has detected no product.

FIG. 17 is a diagram 192 of shelves 194 of the product-display structure 24 (FIG. 2), the diagram including representations 196 of the identified products 22, and of any identified empty columns (here four empty columns) 198, in their respective locations, according to an embodiment. In the following example, the product-display structure 24 holds the following brands of products 22: A, B, C. And the product-display structure 24 should hold the brand D in the empty locations 198. Furthermore, the guidelines, e.g., the planogram, governing the product arrangement in the product-display structure 24 indicate that starting from the top left of the structure, all A products should be linearly adjacent, followed by all B products, all C products, and all D products (the D products are missing, but are indicated in dashed line to indicate that the D products should occupy the empty locations 198). In this example, the guidelines do not govern how many of each product brand the product-display structure 24 should hold, only that the products of each brand are linearly adjacent. And here, "linearly adjacent" means adjacent along a zig-zag line 200 if the line were effectively horizontally "pulled" and straightened.

Referring to FIGS. 2-3, 5, and 17, at the step 190 of the flow diagram 80, the product-arrangement circuit 46 first receives, or determines from the guidelines governing the product-display structure 24, a planogram, which is typically a two-dimensional array showing the guideline product arrangement on each shelf (assuming a product-display structure with shelves) on a product-location-by-product-location basis. But for purposes of example, in the following description the planogram is simplified to be a product-arrangement-template vector with elements ABCD. Therefore, this planogram represents the linear product order, A, B, C, D, which the guidelines specify, over all the shelves. Both the product-display guidelines and the planogram can be stored in the database 32, and the product-arrangement circuit 46 can receive the guidelines and planogram directly from the database, or via the image-processing circuit 42.

Next, still at the step 190, the product-arrangement circuit 46 determines an arrangement of the products 22 along the zig-zag line 200, and generates the following realogram (i.e., a determined-product-arrangement vector), which represents the determined product arrangement: AAAB-CAAAACAAABBBBBBBBBBBBBBBBBCBCCCCeeee (wherein each "e" represents a respective "empty location" 198). Therefore, this realogram represents the determined linear order of the identified products 22 and empty locations 198 in the product-display structure 24, and includes one vector element per product and empty location.

Still at the step 190, because, as described above, the number of consecutive products of the same brand is not specified by the planogram (i.e., the number of consecutive products of the same brand is a "don't care" condition), the product-arrangement circuit 46 modifies the realogram by collapsing each group of consecutive same elements into a single element. Therefore, the resulting modified realogram has the elements ABCACABCBCe.

Next, still at the step 190, the product-arrangement circuit 46 compares the modified realogram ABCACABCBCe to the planogram ABCD in a conventional manner Then, still at the step 190, because the modified realogram and the planogram are unequal, the product-arrangement circuit 46 determines that the arrangement of the products 22 is erroneous.

Next, still at the step 190, the product-arrangement circuit 46 determines the number of errors in the arrangement of the products 22 by determining the minimum number of changes needed to "convert" the modified realogram into the planogram. In this example, the product-arrangement circuit 46 first determines that it must rearrange the order of the "BCA" string (the fourth, fifth, and sixth elements) in the modified realogram ABCACABCBCe to obtain the initial "AB" string of the planogram ABCD. The product-arrangement circuit 46 counts the error that results in the need for an order rearrangement as one error 202. After correction of the first error 202 in the modified realogram (the product-arrangement circuit 46 does not, and typically cannot, actually correct the first error 202 in the product-display structure 24), the resulting one-time-corrected modified realogram is ABCABCBCe.

Furthermore, still at the step 190, because the rearrangement is from "CACA" to "CAB," the product-arrangement circuit 46 can determine that the location of the error 202 is in the sequence of A products (if the product-arrangement circuit is configured to analyze the original realogram, then it also can determine the location of the error within the sequence of A products).

Next, still at the step 190, the product-arrangement circuit 46 compares the one-time-corrected realogram ABCABCBCe to the planogram ABCD.

Then, still at the step 190, because the one-time-corrected modified realogram and the planogram are unequal, the product-arrangement circuit 46 determines that the arrangement of the products 22 has at least one more error.

Next, still at the step 190, the product-arrangement circuit 46 determines that it must rearrange the order of the "ABCA" string (first through fourth elements) in the one-time-corrected modified realogram ABCABCBCe to obtain the string "ABC" of the planogram ABCD. The product-arrangement circuit 46 counts the error that results in the need for the second rearrangement as a second error 204. After correction of the second error 204 in the one-time-corrected modified realogram (the product-arrangement circuit 46 does not, and typically cannot, actually correct the second error 204 in the product-display structure 24), the two-times-corrected modified realogram is ABCBCBCe.

Furthermore, still at the step 190, because a portion of the vector is rearranged from "CABG" to "CBC," the product-arrangement circuit 46 can determine that the location of the second error 204 is in the sequence of A products (if the product-arrangement circuit is configured to analyze the original realogram, then it can determine the location of the second error 204 within the sequence of A products).

Still at the step 190, the product-arrangement circuit 46 continues this procedure to transform the two-times modified realogram ABCBCBCe into the following three-times and four-times modified realograms: ABCBCe (obtained by reversing the first instance of "CB" in the two-times modified realogram ABCBCBCe) and ABCe (obtained by reversing "CB" in the three-times modified realogram ABCBCe). During this continuation of the procedure, the product-arrangement circuit 46 detects a third error 206, and can detect the location of the third error.

Then, still at the step 190, the product-arrangement circuit 46 compares the four-times-corrected modified realogram ABCe to the planogram ABCD.

Next, still at the step 190, because the four-times-corrected modified realogram and the planogram are equal but for the empty locations e, the product-arrangement circuit 46 determines that the arrangement of the products 22 has a total of four errors (three placement errors plus one empty-location error, because even though there are four empty locations 198 in this example, because the empty locations are adjacent, the product-arrangement circuit 46 counts this as one error).

Therefore, still at the step 190, not only does the product-arrangement circuit 46 determine whether the arrangement of products 22 is erroneous, the product-arrangement circuit can determine the number, and can determine the location(s), of the error(s) in the arrangement of products.

Still referring to FIGS. 2-3, 5, and 17, in another embodiment, the number of adjacent ones of the same products A, B, C, and D is specified by the planogram; that is, the number of adjacent ones of the same products A, B, C, and D are not "don't care" conditions. For example, the planogram can be AAAAAAAAAAAAABB-BBBBBBBBBBBBBBCCCCCCDDDD, and the product-arrangement circuit 46 can compare this planogram to the realogram AAAB-CAAAACAAABBBBBBBBBBBBBBBBBCCCCCeeee on an element-by-element basis to determine the number and locations of the errors, which are indicated by bold-underline text in the realogram. That is, the product-arrangement circuit 46 detects an error wherever there is an inequality between corresponding elements of the planogram and realogram. As described above, the planogram and realogram are typically two-dimensional arrays that showing the guideline product arrangement, and the actual product arrangement, respectively, on each shelf (assuming a product-display structure with shelves) on a product-location-by-product-location basis. Therefore, the planogram and realogram allow pinpointing the row and row location at which a non-compliance error occurs. But for purposes of example, in the immediately preceding description, the planogram and realogram are simplified to be vectors respectively representing the guideline linear product order and the actual linear product order over all of the shelves.

To determine whether a product arrangement is erroneous, and to determine the number and locations of the errors in an erroneous product arrangement, as described above in conjunction with FIGS. 2-3, 5, and 17, the product-arrangement circuit 46 can implement a planogram-analysis algorithm such as a modified edit-distance algorithm or a string-matching algorithm. An example of a suitable string-matching algorithm is disclosed in Navarro, G., *A Guided Tour to Approximate String Matching*, ACM Computing Surveys (CSUR), 33(1), 31-88 (2001), http://users.csc.calpoly.edu/~dekhtyar/570-Fall2011/papers/navarro-approximate.pdf, which publication is incorporated by reference.

Still referring to the step 190, after the product-arrangement circuit 46 has determined whether the arrangement of products 22 is erroneous, and, if so, has determined one or both of the number of errors and the respective location of each error, the product-arrangement circuit provides this information to the score circuit 48.

Figure 1:
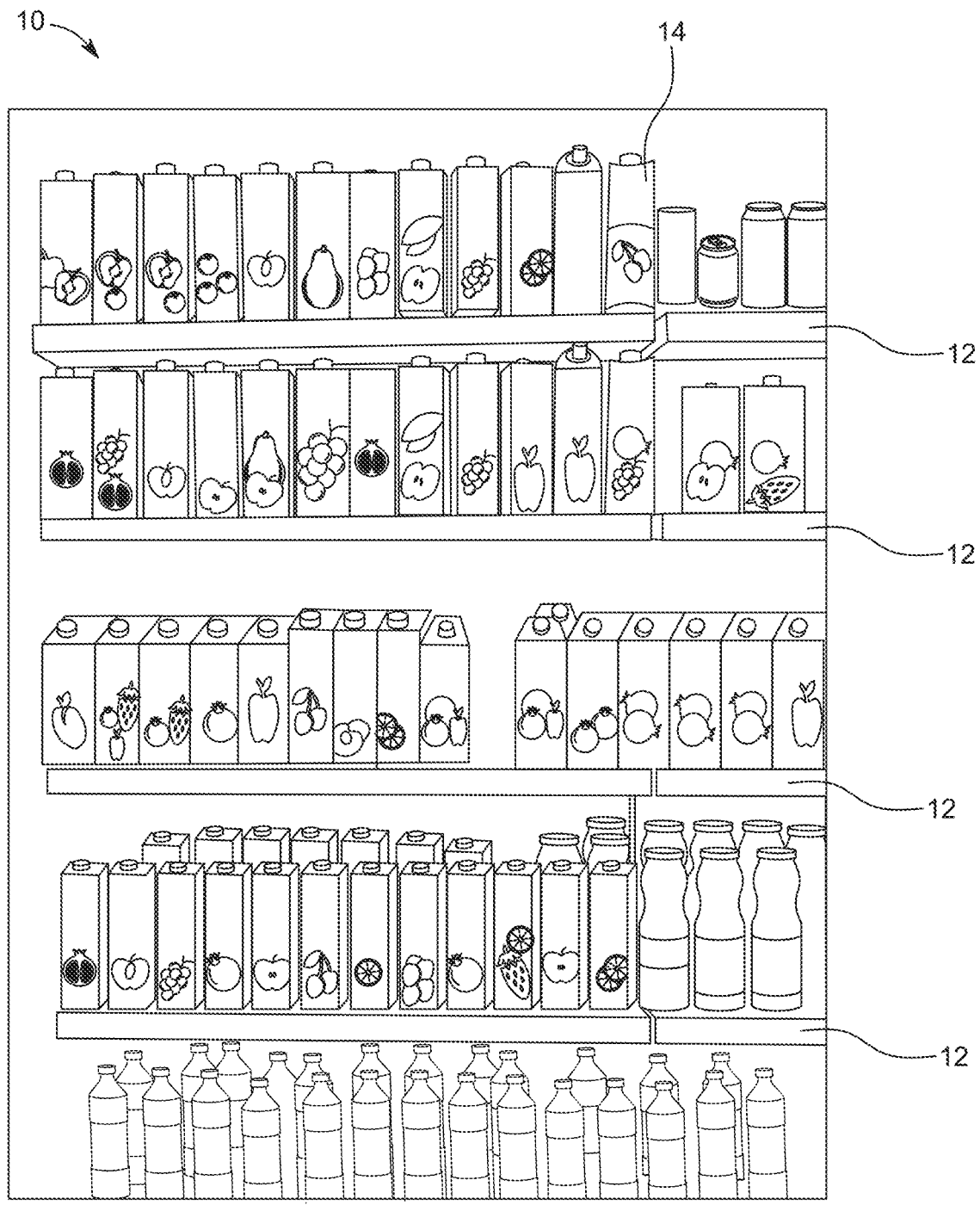
FIG. 1 is a front view of a display structure, which is in the form of a set of shelves that hold and display products for sale.

Referring to FIGS. 1, 3, and 5, at a step 208 of the flow diagram 80, if they have not already done so, the image-processing circuit 42, the pose circuit 44, and the product-arrangement circuit 46 determine information regarding the display of products 22 in the product-display structure 24. For example, from the identified products 22, unidentified products, identified damaged products, identified empty product columns, determined poses of the identified products, and determined arrangement of the identified products, one or more of the image-processing circuit 42, pose circuit 44, product-arrangement circuit 46, and score circuit 48 cooperate to generate a list of displayed products, a representation of the product-display structure 24 with the identified, unidentified, and damaged products in their respective locations with their respective determined poses, empty product columns, errors in the product arrangement, and actions needed to correct the errors. Furthermore, the one or more of the image-processing circuit 42, pose circuit 44, product-arrangement circuit 46, and score circuit 48 can cooperate to generate, as part of the representation of the product-display structure 24, respective markers to indicate the identities of the products 22, damaged products, products having improper poses, products in improper locations, and products that should be stocked in empty locations.

Then, referring to FIGS. 2-4 and 5, from the step 208 of the flow diagram 80, the scoring circuit 48 proceeds to the step 72 of the flow diagram 60.

FIG. 18 is a more-detailed diagram of the dashboard 36 (FIG. 2), which the scoring circuit 48 (FIG. 3) generates at the step 76 of the flow diagram 60 (FIG. 4), according to an embodiment. The dashboard 36 includes a product-display-structure stock score 212, a pose score 214, a planogram (product-arrangement) score 216, a plot 218 of score history, a planogram 220 (i.e., a representation of the product arrangement specified by the product guidelines) with indications of missing and misplaced products 22, a list 222 of the missing products by stock-keeper unit (SKU), and information 224 regarding brand share. The scoring circuit 48 can generate and update the dashboard 36 in real time.

Referring to FIGS. 5-18, alternate embodiments of the procedure described by the flow diagram 80 are contemplated. For example, the procedure may include steps that are not shown in, or described in conjunction with, the flow diagram 80, and some of the described steps may be omitted or combined with other steps. Furthermore, the steps may be performed in an order different from the order described. Moreover, a step may be performed simultaneously with one or more other steps. In addition, any embodiments described in conjunction with FIGS. 1-4 and 19-22 may be applicable to the procedure described in conjunction with the flow diagram 80 of FIG. 5 and to embodiments described in conjunction with FIGS. 6-18.

Described below in conjunction with FIGS. 19-22 is a procedure for generating a reference image of a product or product label from captured images of the product or product label, even from captured images in which the product or product label is not in its canonical pose. Hereinafter, "product" is used, it being understood that the below description also can apply to a product label.

As described above, staging a photo shoot to obtain a high-quality reference image of a product in its canonical pose can be relatively expensive, for example, on the order of thousands, or tens of thousands, of dollars.

But generating and improving a reference image from lower-quality images captured during another procedure can be substantially less expensive.

For example, generating and improving a reference image of a product from images of the product that the image-capture apparatus 26 (FIG. 2) captures during the above-described procedure for analyzing a display of products 22 (FIG. 2) can add little, or no, extra cost to the procedure.

FIG. 19 is a diagram of the electronic processing system 30 of FIG. 2, the electronic processing circuit being configured to generate, and to improve, a reference image of a product 22 (FIG. 1) from images of the product that the image-capture apparatus 26 (FIG. 2) captures during a product-display-analysis procedure, according to an embodiment.

The electronic processing system 30 includes an optional image-preprocessing circuit 240, an image-processing circuit 242, and a reference-image circuit 244. The image-preprocessing circuit 240 and the image-processing circuit 242 can be respectively similar to, or the same as, the image-preprocessing circuit 40 and the image-processing circuit 42 of FIG. 3. That is, the below-described functions and operations attributed to the image-preprocessing circuit 240 and the image-processing circuit 242 can be respectively performed by the image-preprocessing circuit 40 and the image-processing circuit 42 of FIG. 3. Furthermore, although omitted from FIG. 19, the electronic processing system 30 also can include one or more of the other circuits described above in conjunction with FIG. 3. That is, the electronic processing system 30 can be configured to perform the functions and operations described above in conjunction with FIGS. 2-18, and also can be configured to perform the functions and operations described below in conjunction with FIGS. 19-22.

FIG. 20 is a flow diagram 250 of the operation of the electronic processing system 30 of FIG. 19, according to an embodiment.

FIG. 21 is a diagram of images 252 captured by the image-capture apparatus 26 of FIG. 2, and arranged as a dominant group 254 of "neighbor" pairs 256 of images and a representative image 258, according to an embodiment.

FIG. 22 is a product reference image 260, which the electronic processing system 30 of FIG. 19 generates, and may improve, according to an embodiment.

Referring to FIGS. 19-22, operation of the electronic processing system 30 to generate, and to improve, the reference image 260 from captured images is described, according to an embodiment.

At a step 262 of the flow diagram 250, the image-capture apparatus 26 (FIG. 2) captures images of the products 22 (FIG. 2) in the product-display structure 24 (FIG. 2), and the image-collection circuit 28 (FIG. 2), the image-preprocessing circuit 240, or the image-processing circuit 242 stores at least some of these images in the database 32 (FIG. 2) as described above in conjunction with FIGS. 2-18.

Next, at a step 264 of the flow diagram 250, the image-processing circuit 242 detects key regions for each of at least some of the stored captured images, and generates respective key regions and descriptors $\vec{d}_{cap}$ for each of the key regions as described above in conjunction with FIGS. 5-8.

Then, at a step 266 of the flow diagram 250, the image-processing circuit 242 compares the descriptors $\vec{d}_{cap}$ belonging to each pair of the captured images as described above in conjunction with FIGS. 5-8. For example, if there are three captured images, the image-processing circuit 242 first compares the descriptors $\vec{d}_{cap}$ belonging to the first and second captured images, next compares the descriptors $\vec{d}_{cap}$ belonging to the second and third captured images, and then compares the descriptors $\vec{d}_{cap}$ belonging to the first and third captured images.

Next, at a step 268 of the flow diagram 250, the image-processing circuit 242 determines, for each of the pairs of captured images, whether captured images of the pair of images are neighbor images. The image-processing circuit 242 identifies matching descriptors $\vec{d}_{cap}$ of the two images of the pair of images as described above in conjunction with FIGS. 5-8, and, as shown by lines 270 in FIG. 21. Then, the image-processing circuit 242 compares the number of matching descriptors $\vec{d}_{cap}$ to a neighbor threshold value. If the number of matching descriptors $\vec{d}_{cap}$ equals or exceeds the neighbor threshold value, then the image-processing circuit 242 identifies the pair of captured images as neighbor images 256. Otherwise, the image-processing circuit 242 identifies the pair of captured images as non-neighbor images. In FIG. 21, neighbor images are connected by thicker lines 272.

Then, at a step 274 of the flow diagram 250, the reference-image circuit 244 determines all of the groups of interconnected neighbor images (each image in a group is a neighbor to at least one other image in the group), and identifies the one of the groups 254 having the largest number of captured images as compared to the other groups. If two or more of the groups have the same largest number of captured images as compared to the other groups, then the reference-image circuit 244 selects one of these groups to be the largest group 254 according to any suitable criteria or algorithm.

Next, at a step 276 of the flow diagram 250, the reference-image circuit 244 identifies, as the representative image 258, the image that is part of the most neighbor pairs of images compared to the other images in the largest group 254 of neighbor images. Because the representative image 258 has the most neighbor images, the representative image is more likely than the other images in the largest group 254 to be of the product 22 having a pose that is, or that is close to, the product's canonical pose. This assumption typically holds because product vendors typically strive to position each product 22 in its canonical pose.

Then, at a step 278 of the flow diagram 250, the reference-image circuit 244 converts the representative image 258 into the reference image 260, which represents the canonical pose of the product.

Still referring to the step 278, for each descriptor $\vec{d}_{cap\_rep}$ of the representative image 258 that directly or indirectly matches at least a threshold number of descriptors $\vec{d}_{cap\_nonrep}$ in other images in the group 254, the reference-image circuit 244 geometrically combines the key regions of the representative image and the other images and sets the location of the key region of the representative image equal to the location yielded by this geometric combination. And the reference-image circuit 244 also mathematically combines the descriptor $\vec{d}_{cap\_rep}$ with the descriptors $\vec{d}_{cap\_nonrep}$, and sets the value of $\vec{d}_{cap\_rep}$ equal to the value yielded by this mathematical combination. For example, the threshold number of descriptors can be ≥5% of the total number of images 252 and 258 in the group 254. Further in example, if the threshold percentage is 5% and the total number of images in the group 254 equals one hundred, then a descriptor $\vec{d}_{cap\_rep}$ of the representative image 258 would need to match, either directly or indirectly, respective descriptors $\vec{d}_{cap\_nonrep}$ in at least five of the images 252 to be considered a matching descriptor.

Still referring to the step 278, for example, referring to FIG. 21, the descriptor $\vec{d}_{cap\_rep}$ of a key region 280 of the representative image 258 directly matches a descriptor $\vec{d}_{cap\_nonrep\_1}$ of a key region $282_1$ of a first image $252_1$ and indirectly matches a descriptor $\vec{d}_{cap\_nonrep\_2}$ of a key region $282_2$ of a second image $252_2$; that is, the descriptor $\vec{d}_{cap\_rep}$ of the key region 280 of the representative image 258 matches the descriptor $\vec{d}_{cap\_nonrep\_2}$ of the key region $282_2$ of the second image $252_2$ "through" the key region $282_1$ of the first image $252_1$. And the centers of the key regions 280, $282_1$, and $282_2$ are as follows: $(x_{cap\_rep}, y_{cap\_rep})$, $(x_{cap\_nonrep\_1}, y_{cap\_nonrep\_1})$, and $(x_{cap\_nonrep\_2}, y_{cap\_nonrep\_2})$.

Still referring to the step 278, the reference-image circuit 244 then transforms each captured-image key region 282 via the registration transformations found along the path that links the captured image in which the captured-image key region is located to the representative image 258.

Still referring to the step 278, for example, the reference-image circuit 244 performs the registration transforms, which registers captured images $252_1$ and $252_2$ on to representative image 258, on their respective key regions $282_1$ and $282_2$, so that they are brought to the frame of representative image 258

Next, still referring to the step 278 and further to the example, the reference-image circuit 244 averages the geometric attributes (location, scale and orientation) of the one-time-transformed captured-image key region $282_1$, the two-time-transformed captured-image key region $282_2$, and the representative-image key region 280, and generates a reference key region equal to the result of the averaging. This new key region for the reference image 260 (FIG. 22) can be called the reference-image key region 280.

Then, still referring to the step 278 and further to the example, the reference-image circuit 244 calculates a descriptor for the reference-image key region 280 equal to the average of the descriptors for the captured-image key regions $282_1$ and $282_2$ and the descriptor for the representative-image key region 280 (i.e., the descriptor for the key region 280 prior to its conversion into the reference-image key region.) Alternatively, the reference-image circuit 244 can calculate the descriptor for the reference-image key region 280 from the reference-image key region as described above in conjunction with FIGS. 5-7.

Still referring to the step 278, the reference-image circuit 244 repeats the above procedure for every other set of matching captured-image and representative-image descriptors where the number of matching captured-image descriptors equals or exceeds the threshold number.

Still referring to the step 278, the reference-image circuit 244 then saves, in the database 32 (FIG. 2) as the reference image 260, which is equal to the representative image 258 but with the reference-image key regions and reference-image descriptors calculated per above.

And as the image-capture apparatus 26 (FIG. 2) continues to capture images that include the product 22, the image-processing circuit 242 and the reference-image circuit 244 can further improve the quality of the reference image 260.

For example, the circuits 242 and 244 can repeat the steps 262-278 of the flow diagram 250 with the previously captured images and newly captured images (images captured since the last execution of steps 262-278 for the product in question). Or, the circuits 242 and 244 can repeat the steps 262-278 with only the newly captured images and the stored reference image 260.

Still referring to FIGS. 19-22, alternate embodiments of the procedure described in conjunction with the flow diagram 250 are contemplated. For example, the procedure may include steps that are not shown in, or described in conjunction with, the flow diagram 250, and some of the described steps may be omitted or combined with other steps. Furthermore, the steps may be performed in an order different from the order described. Moreover, a step may be performed simultaneously with one or more other steps. Furthermore, any embodiments described in conjunction with FIGS. 1-18 may be applicable to the procedure described in conjunction with the flow diagram 250 of FIG. 20 and to embodiments described in conjunction with FIGS. 19 and 21-22.

Still referring to FIGS. 19-22, following is a mathematical description of how the image-processing circuit 242 and the reference-image circuit 244 generate the reference image 260 of a product from images of the product that the image-capture apparatus 26 (FIG. 2) captures, according to an embodiment. It is understood that the elements of the above description may not correspond, on an element-by-element basis, to the elements of the below mathematical description. Furthermore, the referenced SURF algorithm is the SURF algorithm described in the above-incorporated paper by H. Bay et al.

Finding Transformation for an Image Pair:

Suppose, we have images I and J, with their SURF key points extracted and corresponding SURF descriptors computed. First, descriptors from I are matched with descriptors from J, as explained above. But this step gives putative matches, to validate them and to find a precise transformation between I and J a further procedure called RANSAC (random sample consensus) is employed on the location correspondences of matched descriptors to ensure the geometric consistency between matches. Note that RANSAC, which is described below, is a well-known algorithm.

Let $P=\{p\_1, \ldots, p\_n\}$ be the set of n key-point locations on image I, each 2D (i.e., $p\_i=(x\_i, y\_i)$), whose descriptors are matched to descriptors in J, now with corresponding set of keypoint locations $Q=\{q\_1, \ldots, q\_n\}$ on J.

If the number n of correspondences is more than or equal to four, the image-processing circuit 242 or the reference-image circuit 242 analytically computes a perspective transformation T, between I and J, which minimizes the vis-a-vis distances between the transformed points T*P from I and the points Q from J. Similarly, if n is larger than or equal to three, the image-processing circuit 242 or the reference-image circuit 242 analytically computes an affine transformation in the same manner Suppose the image-processing circuit 242 or the reference-image circuit 242 computes an affine transformation between I and J, that brings or "registers" I on to J. The image-processing circuit 242 or the reference-image circuit 242, executing the RANSAC algorithm, randomly picks three point correspondences among P and Q, and, as mentioned above, computes an affine transformation T from them. The image-processing circuit 242 or the reference-image circuit 242 applies T to the rest of the correspondences and counts the number of points p from P, that when transformed with T, will fall within an epsilon radius of their target point q from Q, where epsilon is some vicinity threshold. The correspondences for which this condition holds are called inliers, whereas the remainders are called outliers.

The image-processing circuit 242 or the reference-image circuit 242 repeats this procedure, for example, one hundred times, each time with a different random selection of correspondence triplets. Eventually the trial which yielded the most number of inliers retained, and the final transformation that would bring I to J, is recomputed from the inlier correspondences of that trial. Also those inliers and their descriptors are returned as the refined set of correspondence matches, and the outliers are discarded. Now, if the inliers exceed a certain threshold, images I and J are declared as "neighbors".

Finding the Reference Image:

Processing each image pair as above constructs an image neighborhood graph, where each image is represented as a node, and an arc is drawn between each neighboring node pair. From this graph, the image-processing circuit 242 or the reference-image circuit 242 finds the largest connected component, where a connected component is a subgraph, in which there exists at least one path (a chain of arcs and nodes) between any two nodes. The node in this connected component having the most number of neighbors is designated as the representative image, which makes sense in that it is typically the most common view of the product on to which other images are registerable.

Registering Images and Descriptors on to Representative Image:

From this selected connected component, the image-processing circuit 242 or the reference-image circuit 244 finds the so called "maximally weighted spanning tree." In other words, the image-processing circuit 242 or the reference-image circuit 244 erases some arcs between "weak" image neighbors (neighbors that are linked over fewer number of correspondences), so that the resulting pruned graph is still connected but contains no loop, i.e., there exists a unique path between any two nodes. Finding a maximally weighted spanning tree is also a very standard routine in graph theory, it is a spanning tree, which includes all the nodes in the connected component and for which the total of arc weights measured in terms of the number of correspondences between the nodes remains maximal at the end. The reason of finding this tree is to force a unique transformation over the unique path from any image on to the representative image to form the reference image.

Recall that for each neighboring pair the image-processing circuit 242 or the reference-image circuit 244 already has computed the transformation: if I and J are neighbors with transformation T defined from I to J, registering I on to J involves applying T on I, and registering J on I involves applying the inverse of T on J. The product of transformations encountered along the path connecting an image I to the representative image R provides the overall transformation that needs to be applied to I to register it on to R. Thus, the image-processing circuit 242 or the reference-image circuit 244 can bring every image in the connected subgraph to the center representative image to form the reference image.

Similarly, the image-processing circuit 242 or the reference-image circuit 244 can apply the same overall transformation found along the path connecting I to R, to the "inlier" key regions of I, which the image-processing circuit 242 or the reference-image circuit 244 already refined in previous steps to include only the ones that can be matched as inlier correspondences to the key regions of I's neighbors.

Suppose all inlier key regions from all images of the connected component are transferred to the representative image R. The image-processing circuit 242 or the reference-image circuit 244 has a large set of points sitting on the frame of R, where it is already known from which image they come. The image-processing circuit 242 or the reference-image circuit 244 again draws an arc between any two key regions, if they were matched as inlier correspondences for their respective captured source images. This yields another graph, similar to the image graph mentioned above.

The image-processing circuit 242 or the reference-image circuit 244 again finds the connected components of this point graph. Each connected component will correspond to group of key regions and their descriptors that are shared between at least two images. That is, a connected component is simply composed of replicas of a key region that is consistently detected across multiple example images of the same product. The image-processing circuit 242 or the reference-image circuit 244 can even apply a threshold on the component size to eliminate small connected components and ensure a stronger consistency condition. This (along with the RANSAC step above) helps to ensure that no matter how cluttered the example images are, with say, the background and other variations, the resulting key regions and descriptors are characteristic to the product and the product only.

Now, the image-processing circuit 242 or the reference-image circuit 244 computes the average location, average scale, and average orientation for each connected component of key regions using their known geometric attributes, where note that these attributes are already transformed and adjusted on the representative image using the known transformations found for their source images. For the descriptors, the image-processing circuit 242 or the reference-image circuit 244 don't need to apply these transformations, since the SURF algorithm has already computed them invariant to small transformations. So the image-processing circuit 242 or the reference-image circuit 244 applies simple averaging for the descriptors. As a result, the image-processing circuit 242 or the reference-image circuit 244 obtains a mean location, mean scale, mean orientation, and mean descriptor for each connected component in the key-region graph, which are more robust and stable than the case where the image-processing circuit 242 or the reference-image circuit 244 found them from a single training image. These mean attributes can now be used, as if they come from a single high-resolution model image containing the product in its canonical pose. The bounding rectangle tightly containing the collection of all mean key region locations can also be used as the product frame for the canonical pose. Again the three corners of this rectangle can be returned as our anchor points. In brief, the canonical pose, the anchors, consistent key regions, and their stable and robust descriptors are all computed fully automatically using this procedure, without requiring the capture of images in which it is known, a priori, that a product is in its canonical pose, and without requiring manual cropping of the products from them to produce anchors.

A number of embodiments defined by the following claims have been described. Nevertheless, it will be understood that various modifications to the described embodiments may be made without departing from the spirit and scope of the disclosure. For example, an alternative described in conjunction with one embodiment may be applied to another embodiment. Accordingly, other embodiments are within the scope of the following claims.

The invention claimed is:

1. An electronic processing system, comprising:
   an image-processing circuit configured
     to receive a captured image of at least one product disposed in a display structure, and
     to identify each of the at least one product in the captured image;
   a pose circuit configured
     to determine a pose of a respective label on each of the at least one product,
     to compare the pose of the respective label on each of the at least one product to a canonical pose of the respective label on each of the at least one product, and
     to determine at least one distance by determining a distance between the pose of the respective label on each of the at least one product and the canonical pose of the respective label on each of the at least one product; and
   a score circuit configured to generate a pose score in response to the at least one distance by
     determining at least one relationship by determining a relationship between each of the at least one distance and an error threshold, and
     generating the pose score in response to the at least one relationship.

2. The electronic processing system of claim 1 wherein:
   each of the at least one product has a respective size in a dimension; and
   the image-processing circuit is configured to receive the captured image from a camera mounted a distance from the display structure, the distance being at least ten times the respective size of a largest of the at least one product.

3. The electronic processing system of claim 1 wherein the image-processing circuit is configured to receive the captured image from an image-preprocessing circuit that is configured to receive a sequence of captured images of the at least one product disposed in the display structure, to compare the captured images in the sequence to one another, to identify, as the captured image, an image in the sequence that is different from a previous image in the sequence, and to provide the captured image to the image-processing circuit.

4. The electronic processing system of claim 1, further comprising an image-preprocessing circuit configured to receive a sequence of captured images of the at least one product disposed in the display structure, to compare the captured images to one another, to identify, as the captured image, an image in the sequence that is different from a previous image in the sequence, and to provide the captured image to the image-processing circuit.

5. The electronic processing system of claim 1, further comprising:
   wherein the image-processing circuit is configured to determine a respective location of each of the at least one product;
   a product-arrangement circuit configured
     to determine an arrangement of the identified products in response to the respective location of each of the at least one product, and
     to compare the determined arrangement to a product-arrangement template; and
   the score circuit configured to generate a product-arrangement score in response to a comparison of the determined arrangement to the product-arrangement template.

6. The electronic processing system of claim 1 wherein:
the image-processing circuit is configured to identify at least one location unoccupied by a product; and
the score circuit is configured to generate a stocked-display score in response to the identified at least one location unoccupied by a product.

7. The electronic processing system of claim 1, further comprising:
wherein the image-processing circuit is configured to identify at least one location unoccupied by a product;
a product-arrangement circuit configured
to determine an arrangement of the identified at least one product and the identified at least one location unoccupied by a product, and
to compare the determined arrangement to a product-arrangement template; and
wherein the score circuit is configured to generate a product-arrangement score and a stocked-display score in response to a comparison of the determined arrangement to the product-arrangement template.

8. The electronic processing system of claim 1, further comprising a display circuit configured to generate an electronic representation of an electronically displayable dashboard that includes the pose score.

9. The electronic processing system of claim 1 wherein the image-processing circuit is configured to identify each of the at least one product in the captured image by:
detecting a region of the captured image in which a representation of a product of the at least one product is located, the region having a characteristic;
calculating descriptors of the region of the captured image;
comparing each of the calculated descriptors to descriptors of reference images of identified products; and
identifying the product of the at least one product in the captured image as a product in a reference image having descriptors that most closely match the calculated descriptors of the region of the captured image.

10. The electronic processing system of claim 9 wherein the characteristic includes a contrast that equals or exceeds a threshold.

11. The electronic processing system of claim 1 wherein:
the image-processing circuit is configured to receive the captured image and to identify each of the at least one product in the captured image in real time;
the pose circuit is configured to determine the pose of the respective label on each of the at least one product, to compare the pose of the respective label on each of the at least one product to a canonical pose of the respective label on each of the at least one product, and to determine the at least one distance by determining the distance between the pose of the respective label on each of the at least one product and the canonical pose of the respective label on each of the at least one product, in real time; and
the score circuit is configured to generate, and to update, the pose score in real time.

12. The electronic processing system of claim 1 wherein the pose circuit is configured:
to determine a pose of a respective label attached to each of the at least one product;
to compare the pose of the respective label attached to each of the at least one product to a canonical pose of the respective label attached to each of the at least one product; and
to determine the at least onea distance bv determining a distance between the pose of the respective label attached to each of the at least one product and the canonical pose of the respective label attached to each of the at least one product.

13. The electronic processing system of claim 1 wherein the pose circuit is configured:
to determine a pose of a respective label affixed to each of the at least one product;
to compare the pose of the respective label affixed to each of the at least one product to a canonical pose of the respective label affixed to each of the at least one product; and
to determine the at least one distance by determining a distance between the pose of the respective label affixed to each of the at least one product and the canonical pose of the respective label affixed to each of the at least one product.

14. The electronic processing system of claim 1 wherein the pose circuit is configured:
to determine a pose of a respective label printed on each of the at least one product;
to compare the pose of the respective label printed on each of the at least one product to a canonical pose of the respective label printed on each of the at least one product; and
to determine the at least one distance bv determining a distance between the pose of the respective label printed on each of the at least one product and the canonical pose of the respective label printed on each of the at least one product.

15. The electronic processing system of claim 1 wherein the pose circuit is configured:
to determine a pose of a respective label formed on each of the at least one product;
to compare the pose of the respective label formed on each of the at least one product to a canonical pose of the respective label formed on each of the at least one product; and
to determine the at least one distance by determining a distance between the pose of the respective label formed on each of the at least one product and the canonical pose of the respective label formed on each of the at least one product.

16. The electronic processing system of claim 1 wherein the pose circuit is configured:
to determine a pose of a respective label integral with each of the at least one product;
to compare the pose of the respective label integral with each of the at least one product to a canonical pose of the respective label integral with each of the at least one product; and
to determine the at least one distance by determining a distance between the pose of the respective label integral with each of the at least one product and the canonical pose of the respective label integral with each of the at least one product.

17. The electronic processing system of claim 1 wherein the at least one distance includes at least one rotational distance.

18. The electronic processing system of claim 1 wherein the at least one distance includes at least one rotational distance in a plane of the captured image.

19. The electronic processing system of claim 1 wherein the at least one distance includes at least one rotational distance about an axis parallel to a plane of the captured image.

20. The electronic processing system of claim 1 wherein the at least one distance includes at least one clockwise or counterclockwise_rotational distance of a label on a product while the product is disposed on a shelf.

21. The electronic processing system of claim 1 wherein one or more of the at least one product is round in a plane in which the pose circuit is configured to determine the at least one distance.

22. The electronic processing system of claim 1 wherein each of one or more of the at least one product is cylindrical about a respective axis about which the pose circuit is configured to determine a corresponding one of the at least one distance.

23. An electronic processing system, comprising:
   an image-processing circuit configured
      to receive a captured image of at least one produce disposed in a display structure, and
      to identify each of the at least one product in the captured image;
   a pose circuit configured
      to determine a respective pose of each of the at least one product, and
      to compare the respective pose of each of the at least one product to a respective canonical pose of each of the at least one product;
   a score circuit configured to generate a pose score in response to a respective comparison for each of the at least one product;
   wherein
   the image-processing circuit is further configured
      to detect a region of the captured image in which a representation of a product of the at least one product is located, the region having a characteristic,
      to calfulate descriptors of the region of the captured image,
      to compare each of the calculated deescriptors to descriptors of reference images of identified produces, and
      to identify the product of the at least one product in the captured image as a product in a reference image having desriptors that most closely match the calculated descriptors of the region of the captured image; and
   wherein the pose circuit is further configured to determine a pose of a respective label of theidentified product in the captured image by
      for each descriptor of the reference image that matches a descriptor of the region of the captured image,
         translting the reference image such that a key region of the reference image is approximaely aligned with a key region of the region of the captured image, and
         determining, for each anchor point of the reference image, an anchor line that intersects the anchor point and that is approximately parallel to an edge line of the key region of the captured image;
      locating each anchor point of the captured image in a region of the captured image in which the anchor lines for the corresponding anchor point of the reference image intersect, and
      determining the pose of the respective product label in the captured image in response to the anchor points of the captured image.

24. A method, comprising:
   identifying, electronically, each of at least one product in a captured image of the at least one product disposed in a display structure;
   determining, electronically, a respective pose of each of the at least one product;
   comparing, electronically, the respective pose of each of the at least one product to a respective canonical pose of each of the at least one product;
   generating, electronically, a pose score in response to a respective pose comparison for the label of each of the at least one product; and
   wherein determining the pose of each of the at least one product in the captured image includes:
      detecting a region of the captured image in which a representation of a product of the at least one product is located, the region having a characteristic;
      calculating descriptors of the region of the captured image;
      comparing each of the calculated descriptors to descriptors of reference images of identified products;
      identifying the product of the at least one product in the captured image as a product in a reference image having descriptors that most closely match the calculated descriptors of the region of the captured image;
      for each descriptor of the reference image that matches a descriptor of the image,
         translating the reference image such that a key region of the reference image is approximately aligned with a key region of the captured image, and
         determining, for each anchor point of the reference image, an anchor line that intersects the anchor point and that is approximately parallel to an edge line of the key region of the captured image; and
      locating each anchor point of the captured image in a region of the captured image in which the anchor lines for the corresponding anchor point of the reference image intersect.

* * * * *